United States Patent [19]
Shoup et al.

[11] Patent Number: 6,073,134
[45] Date of Patent: Jun. 6, 2000

[54] METHOD ARTICLE OF MANUFACTURE, AND APPARATUS FOR GENERATING A MULTI-DIMENSIONAL RECORD MANAGEMENT INDEX

[75] Inventors: Randall Shoup; James Wolf, both of San Francisco, Calif.

[73] Assignee: Oracle Corporation, Redwood Shores, Calif.

[21] Appl. No.: 08/865,560

[22] Filed: May 29, 1997

[51] Int. Cl.[7] .................................................... G06F 17/30
[52] U.S. Cl. ............................ 707/100; 707/3; 707/102
[58] Field of Search .......................... 707/1, 2, 3, 100, 707/102

[56] References Cited

U.S. PATENT DOCUMENTS

| | | | |
|---|---|---|---|
| 5,359,724 | 10/1994 | Earle | 707/205 |
| 5,647,058 | 7/1997 | Agrawal | 707/1 |
| 5,706,495 | 1/1998 | Chadha et al. | 707/2 |
| 5,721,910 | 2/1998 | Unger et al. | 707/100 |
| 5,752,243 | 5/1998 | Reiter et al. | 707/3 |
| 5,761,652 | 6/1998 | Wu et al. | 707/2 |
| 5,799,300 | 8/1998 | Agrawal et al. | 707/5 |

*Primary Examiner*—Thomas G. Black
*Assistant Examiner*—Frantz Coby
*Attorney, Agent, or Firm*—Stattler, Johansen & Adeli LLP

[57] ABSTRACT

A record management system is provided for generating a multi-dimensional view for different measures. A set of records is retrieved in response to a set of queries. The records include dimension values and measure values, which are associated with the measures. The set of records is maintained in a master table. The record management system generates a record structure foundation, including a query map and a master table index. The record management system then employs the record structure foundation to generate a multi-dimensional layout mapping for the measures that are to be represented in the view. The record structure foundation and measure values in the master table are used to convert the layout mapping into the desired multi-dimensional view. The record management system includes data storage units for implementing the master table, query map, master table index, and layout mapping. These data storage units are coupled to a set of processing engines, which include a control engine, query engine, index engine, and layout engine that provide for performing operations that result in the generation of a multi-dimensional view.

16 Claims, 23 Drawing Sheets

|  | 1995 | | | 1996 | | |
|---|---|---|---|---|---|---|
|  | VCR | TV | Stereo | VCR | TV | Stereo |
| East | $101_1$ | $101_2$ | $101_3$ | $101_7$ | $101_8$ | $101_9$ |
| West | $101_4$ | $101_5$ | $101_6$ | $101_{10}$ | $101_{11}$ | $101_{12}$ |

FIG. 1B
(Prior Art)

MASTER TABLE

| Q#: R# | Year | Region | Product | Sales($) | |
|---|---|---|---|---|---|
| Q1:1 | 1995 | East | VCR | $50,000 | —$301_1$ |
| Q1:2 | 1995 | East | TV | $40,000 | —$301_2$ |
| Q1:3 | 1995 | West | VCR | $50,000 | —$301_3$ |
| Q1:4 | 1995 | West | TV | $30,000 | —$301_4$ |
| Q1:5 | 1996 | East | VCR | $60,000 | —$301_5$ |
| Q1:6 | 1996 | East | TV | $50,000 | —$301_6$ |
| Q1:7 | 1996 | East | Stereo | $20,000 | —$301_7$ |
| Q1:8 | 1996 | West | VCR | $50,000 | —$301_8$ |
| Q1:9 | 1996 | West | TV | $40,000 | —$301_9$ |
| Q1:10 | 1996 | West | Stereo | $10,000 | —$301_{10}$ |

*FIG. 7A*

QUERY MAP

| | |
|---|---|
| Query 1 | Year, Region, Product, Sales($) —$311$ |

MASTER TABLE INDEX

| Dimension | Dimension Value | Query: Records |
|---|---|---|
| Year | 1995 | Q1: 1-4 |
| Year | 1996 | Q1: 5-10 |
| Region | East | Q1: 1-2, 5-7 |
| Region | West | Q1: 3-4, 8-10 |
| Product | VCR | Q1: 1, 3, 5, 8 |
| Product | TV | Q1: 2, 4, 6, 9 |
| Product | Stereo | Q1: 7, 10 |

|  | Group 1H | Group 2H | Group 3H | Group 4H | Group 5H |
|---|---|---|---|---|---|
| Group 1V | $332_1$ | $332_2$ | $332_3$ | $332_4$ | $332_5$ |
| Group 2V | $332_6$ | $332_7$ | $332_8$ | $332_9$ | $332_{10}$ |

|  | 1995 | | 1996 | | |
|---|---|---|---|---|---|
|  | VCR | TV | VCR | TV | Stereo |
| East | $50,000 | $40,000 | $60,000 | $50,000 | $20,000 |
| West | $50,000 | $30,000 | $50,000 | $40,000 | $10,000 |

334

| MASTER TABLE | | | | | |
|---|---|---|---|---|---|
| Q#: R# | Year | Region | Product | Sales($) | |
| Q1: 1 | 1995 | East | VCR | $50,000 | $301_1$ |
| Q1: 2 | 1995 | East | TV | $40,000 | $301_2$ |
| Q1: 3 | 1995 | West | VCR | $50,000 | $301_3$ |
| Q1: 4 | 1995 | West | TV | $30,000 | $301_4$ |
| Q1: 5 | 1996 | East | VCR | $60,000 | $301_5$ |
| Q1: 6 | 1996 | East | TV | $50,000 | $301_6$ |
| Q1: 7 | 1996 | East | Stereo | $20,000 | $301_7$ |
| Q1: 8 | 1996 | West | VCR | $50,000 | $301_8$ |
| Q1: 9 | 1996 | West | TV | $40,000 | $301_9$ |
| Q1: 10 | 1996 | West | Stereo | $10,000 | $301_{10}$ |

| Q#: R# | Year | Region | Sales Office | Product | Sales($) | |
|---|---|---|---|---|---|---|
| Q2: 1 | 1995 | East | New York | VCR | $25,000 | $302_1$ |
| Q2: 2 | 1995 | East | Boston | VCR | $25,000 | $302_2$ |
| Q2: 3 | 1995 | East | New York | TV | $10,000 | $302_3$ |
| Q2: 4 | 1995 | East | Boston | TV | $30,000 | $302_4$ |
| Q2: 5 | 1996 | East | New York | VCR | $30,000 | $302_5$ |
| Q2: 6 | 1996 | East | Boston | VCR | $20,000 | $302_6$ |
| Q2: 7 | 1996 | East | Philadelphia | VCR | $10,000 | $302_7$ |
| Q2: 8 | 1996 | East | New York | TV | $10,000 | $302_8$ |
| Q2: 9 | 1996 | East | Boston | TV | $30,000 | $302_9$ |
| Q2: 10 | 1996 | East | Philadelphia | TV | $10,000 | $302_{10}$ |
| Q2: 11 | 1996 | East | New York | Stereo | $10,000 | $302_{11}$ |
| Q2: 12 | 1996 | East | Boston | Stereo | $5,000 | $302_{12}$ |
| Q2: 13 | 1996 | East | Philadelphia | Stereo | $5,000 | $302_{13}$ |

*FIG. 10A*

| QUERY MAP | |
|---|---|
| Query 1 | Year, Region, Product, Sales($) |
| Query 2 | Year, Region(East), Sales Office, Product, Sales($) |

| MASTER TABLE INDEX | | |
|---|---|---|
| Dimension | Dimension Value | |
| Year | 1995 | Q1: 1-4<br>Q2: 1-4 |
| Year | 1996 | Q1: 5-10<br>Q2: 5-13 |
| Region | East | Q1: 1-2, 5-7<br>Q2: 1-13 |
| Region | West | Q1: 3-4, 8-10 |
| Product | VCR | Q1: 1, 3, 5, 8<br>Q2: 1-2, 5-7 |
| Product | TV | Q1: 2, 4, 6, 9<br>Q2: 3-4, 8-10 |
| Product | Stereo | Q1: 7, 10<br>Q2: 11-13 |
| Sales Office | New York | Q2: 1, 3, 5, 8, 11 |
| Sales Office | Boston | Q2: 2, 4, 6, 9, 12 |
| Sales Office | Philadelphia | Q2: 7, 10, 13 |

|  | Group 1H | Group 2H | Group 3H | Group 4H | Group 5H |
|---|---|---|---|---|---|
| Group 1V | $342_1$ | $342_2$ | $342_3$ | $342_4$ | $342_5$ |
| Group 2V | $342_6$ | $342_7$ | $342_8$ | $342_9$ | $342_{10}$ |
| Group 3V | $342_{11}$ | $342_{12}$ | $342_{13}$ | $342_{14}$ | $342_{15}$ |

341 → row labels; 340 → table; 342 → cells.

*FIG. 11*

|  |  | 1995 | | 1996 | | |
|---|---|---|---|---|---|---|
|  |  | VCR | TV | VCR | TV | Stereo |
| East | New York | $25,000 | $10,000 | $30,000 | $10,000 | $10,000 |
|  | Boston | $25,000 | $30,000 | $20,000 | $30,000 | $5,000 |
|  | Philadelphia | N/A | N/A | $10,000 | $10,000 | $5,000 |
| West |  | $50,000 | $30,000 | $50,000 | $40,000 | $10,000 |

*FIG. 12*

|  | Group 1H | Group 2H |
|---|---|---|
| Group 1V | $352_1$ | $352_2$ |
| Group 2V | $352_3$ | $352_4$ |

*FIG. 13*

|  | 1995 | |
|---|---|---|
|  | VCR | TV |
| East | $50,000 | $40,000 |
| West | $50,000 | $30,000 |

*FIG. 14*

| MASTER TABLE | | | | | |
|---|---|---|---|---|---|
| Q#: R# | Year | Region | Product | Sales ($) | |
| Q1: 1 | 1995 | East | VCR | $50,000 | 301₁ |
| Q1: 2 | 1995 | East | TV | $40,000 | 301₂ |
| Q1: 3 | 1995 | West | VCR | $50,000 | 301₃ |
| Q1: 4 | 1995 | West | TV | $30,000 | 301₄ |
| Q1: 5 | 1996 | East | VCR | $60,000 | 301₅ |
| Q1: 6 | 1996 | East | TV | $50,000 | 301₆ |
| Q1: 7 | 1996 | East | Stereo | $20,000 | 301₇ |
| Q1: 8 | 1996 | West | VCR | $50,000 | 301₈ |
| Q1: 9 | 1996 | West | TV | $40,000 | 301₉ |
| Q1: 10 | 1996 | West | Stereo | $10,000 | 301₁₀ |

| Q#: R# | Year | Region | Sales Office | Product | Sales($) | |
|---|---|---|---|---|---|---|
| Q2: 1 | 1995 | East | New York | VCR | $25,000 | 302₁ |
| Q2: 2 | 1995 | East | Boston | VCR | $25,000 | 302₂ |
| Q2: 3 | 1995 | East | New York | TV | $10,000 | 302₃ |
| Q2: 4 | 1995 | East | Boston | TV | $30,000 | 302₄ |
| Q2: 5 | 1996 | East | New York | VCR | $30,000 | 302₅ |
| Q2: 6 | 1996 | East | Boston | VCR | $20,000 | 302₆ |
| Q2: 7 | 1996 | East | Philadelphia | VCR | $10,000 | 302₇ |
| Q2: 8 | 1996 | East | New York | TV | $10,000 | 302₈ |
| Q2: 9 | 1996 | East | Boston | TV | $30,000 | 302₉ |
| Q2: 10 | 1996 | East | Philadelphia | TV | $10,000 | 302₁₀ |
| Q2: 11 | 1996 | East | New York | Stereo | $10,000 | 302₁₁ |
| Q2: 12 | 1996 | East | Boston | Stereo | $5,000 | 302₁₂ |
| Q2: 13 | 1996 | East | Philadelphia | Stereo | $5,000 | 302₁₃ |

*FIG. 15A (Part 1)*

| MASTER TABLE (CONTINTUED) | | | | | | |
|---|---|---|---|---|---|---|
| Q#: R# | Region | Year | Fiscal Period | Sales($) | Sales(U) | |
| Q3: 1 | East | 1995 | P1 | $20,000 | 100 | 303₁ |
| Q3: 2 | East | 1995 | P2 | $30,000 | 150 | 303₂ |
| Q3: 3 | East | 1995 | P3 | $20,000 | 100 | 303₃ |
| Q3: 4 | East | 1995 | P4 | $20,000 | 100 | 303₄ |
| Q3: 5 | West | 1995 | P1 | $10,000 | 50 | 303₅ |
| Q3: 6 | West | 1995 | P2 | $20,000 | 100 | 303₆ |
| Q3: 7 | West | 1995 | P3 | $30,000 | 150 | 303₇ |
| Q3: 8 | West | 1995 | P4 | $20,000 | 100 | 303₈ |
| Q3: 9 | East | 1996 | P1 | $30,000 | 150 | 303₉ |
| Q3: 10 | East | 1996 | P2 | $40,000 | 200 | 303₁₀ |
| Q3: 11 | East | 1996 | P3 | $30,000 | 150 | 303₁₁ |
| Q3: 12 | East | 1996 | P4 | $30,000 | 150 | 303₁₂ |
| Q3: 13 | West | 1996 | P1 | $20,000 | 100 | 303₁₃ |
| Q3: 14 | West | 1996 | P2 | $30,000 | 150 | 303₁₄ |
| Q3: 15 | West | 1996 | P3 | $30,000 | 150 | 303₁₅ |
| Q3: 16 | West | 1996 | P4 | $20,000 | 100 | 303₁₆ |

*FIG. 15A (Part 2)*

| QUERY MAP | | |
|---|---|---|
| Query 1 | Year, Region, Product, Sales($) | 311 |
| Query 2 | Year, Region, Product, Sales Office, Sales($) | 312 |
| Query 3 | Region, Year, Fiscal Period, Sales($), Sales(U) | 313 |

*FIG. 15B*

| MASTER TABLE INDEX ||||
|---|---|---|---|
| Dimension | Dimension Value | Query: Records ||
| Year | 1995 | Q1: 1-4<br>Q2: 1-4<br>Q3: 1-8 | $320_1$ |
| Year | 1996 | Q1: 5-10<br>Q2: 5-13<br>Q3: 9-16 | $320_2$ |
| Region | East | Q1: 1-2, 5-7<br>Q2: 1-13<br>Q3: 1-4, 9-12 | $320_3$ |
| Region | West | Q1: 3-4, 8-10<br>Q3: 5-8, 13-16 | $320_4$ |
| Product | VCR | Q1: 1, 3, 5, 8<br>Q2: 1-2, 5-7 | $320_5$ |
| Product | TV | Q1: 2, 4, 6, 9<br>Q2: 3-4, 8-10 | $320_6$ |
| Product | Stereo | Q1: 7, 10<br>Q2: 11-13 | $320_7$ |
| Sales Office | New York | Q2: 1, 3, 5, 8, 11 | $320_8$ |
| Sales Office | Boston | Q2: 2, 4, 6, 9, 12 | $320_9$ |
| Sales Office | Philadelphia | Q2: 7, 10, 13 | $320_{10}$ |
| Fiscal Period | P1 | Q3: 1, 5, 9, 13 | $320_{11}$ |
| Fiscal Period | P2 | Q3: 2, 6, 10, 14 | $320_{12}$ |
| Fiscal Period | P3 | Q3: 3, 7, 11, 15 | $320_{13}$ |
| Fiscal Period | P4 | Q3: 4, 8, 12, 16 | $320_{14}$ |

Table 360:

| | Group 1H | Group 2H | Group 3H | Group 4H | Group 5H | Group 6H | Group 7H | Group 8H |
|---|---|---|---|---|---|---|---|---|
| | $362_1$ | $362_2$ | $362_3$ | $362_4$ | $362_5$ | $362_6$ | $362_7$ | $362_8$ |
| | $362_9$ | $362_{10}$ | $362_{11}$ | $362_{12}$ | $362_{13}$ | $362_{14}$ | $362_{15}$ | $362_{16}$ |

Table 361:

| Group 1V |
| Group 2V |

FIG. 17

Table 363 / 364:

| | | 1995 | | | | 1996 | | | |
|---|---|---|---|---|---|---|---|---|---|
| | | P1 | P2 | P3 | P4 | P1 | P2 | P3 | P4 |
| East | Sales($) | $20,000 | $30,000 | $20,000 | $20,000 | $30,000 | $40,000 | $30,000 | $30,000 |
| | Sales(U) | 100 U | 150 U | 100 U | 100 U | 150 U | 200 U | 150 U | 150 U |
| West | Sales($) | $10,000 | $20,000 | $30,000 | $20,000 | $20,000 | $30,000 | $30,000 | $20,000 |
| | Sales(U) | 50 U | 100 U | 150 U | 100 U | 100 U | 150 U | 150 U | 100 U |

FIG. 18

| | Group 1H | Group 2H |
|---|---|---|
| Group 1V | 372₁ | 372₂ |
| Group 2V | 372₃ | 372₄ |
| Group 3V | 372₅ | 372₆ |
| Group 4V | 372₇ | 372₈ |

| | 1995 | 1996 |
|---|---|---|
| P1 | $30,000 | $50,000 |
| P2 | $50,000 | $70,000 |
| P3 | $50,000 | $60,000 |
| P4 | $40,000 | $50,000 |

373, 374

METHOD ARTICLE OF MANUFACTURE, AND APPARATUS FOR GENERATING A MULTI-DIMENSIONAL RECORD MANAGEMENT INDEX

BACKGROUND OF THE INVENTION

A. Field of Invention

The present invention is directed toward the field of information systems. More particularly, the present invention is directed toward providing multi-dimensional organization, maintenance, and views of records.

B. Description of Related Art

Database management systems are employed to manage large amounts of records in a database. These systems provide for storing, accessing, and manipulating the records. Records may be extracted from a database management system by submitting a query to the system. In response to the query, the database management system searches the records in the database to identify and provide a set of records which correspond to the requirements set forth in the query.

Once a set of records is provided in response to the query, a person who submitted the query may wish to view the records in a particular format. It is often desirable to view the records in a multi-dimensional format. In a multi-dimensional format, each value in a record is categorized as being either a dimension value or a measure value. The dimension values characterize the measure values, and the measure values contain data to be either quantitatively or qualitatively analyzed.

For example, a company may have sold video cassette recorders, televisions, and stereos in 1995 and 1996 in both an eastern region and a western region of the United States. The measure of sales made by the company may be characterized by a number of different dimensions. One possible set of dimensions includes a region dimension, year dimension, and product dimension.

FIG. 1(a) illustrates a traditional multi-dimensional record structure 90 characterizing the company's sales with respect to the region, year, and product dimensions. The record structure 90 is formed so that cells $91_{1-12}$ in the structure 90 are filled with sales measure values, which are retrieved from a database or other source of records such as a data file. The x-axis 92 of the structure 90 is sectioned into regions that correspond to a set of product dimension values, namely, video cassette recorder ("VCR"), television ("TV"), and stereo. The y-axis 93 of the structure 90 is sectioned into regions that correspond to a set of region dimension values, namely East and West. The z-axis 94 of the structure 90 is sectioned into regions that correspond to a set of year dimension values, namely, 1995 and 1996.

Each sales measure value residing in a cell $91_{1-12}$ is characterized by the combination of a product dimension value, a region dimension value, and a year dimension value. The measure value in the front upper left hand cell $91_1$ is characterized by the VCR product dimension value, East region dimension value, and 1995 year dimension value. Accordingly, the measure value in cell $91_1$ indicates the sales of VCR's in the East region of the United States in 1995.

The multi-dimensional record structure 90 in FIG. 1(a) may also be represented in the format of the multi-dimensional record structure 100 shown in FIG. 1(b). Structure 100 provides a two dimensional set of cells $101_{1-12}$ containing sales measure values. Each axis of a cell in structure 100 is characterized by a set of dimension values. The horizontal axis 104 of the structure 100 is divided into a set of sections. Each of these sections corresponds to a unique pair of a year dimension value and a product dimension value. The vertical axis 103 of the structure 100 is also divided into a set of sections. Each of these sections corresponds to a unique region dimension value. The upper left hand cell $101_1$ in the structure 100 contains a measure value indicating the sales of VCR's in the East region of the United States in 1995.

FIG. 2 illustrates a conventional multi-dimensional record management system 110, which creates multi-dimensional record structures. The multi-dimensional record management system 110 retrieves records to be employed in a multi-dimensional record structure from a data source, such as a data file or database. Once the multi-dimensional record structure is created no further access to the data source is necessary. Alternatively, data may be directly input to the record management system 110 by a user.

The multi-dimensional record management system 110 includes an input control unit 112, display unit 121, several data storage modules, and several processing engines. These components are coupled together by a system bus 122 that provides for the transfer of data, address, and control signals between the components. The system bus 122 may be extended outside the multi-dimensional record management system 110 to couple the record management system 110 to a data source.

The input control unit 112 enables a record management system 110 user to provide instructions or data to the system 110 through an input device, such as a keyboard or mouse. The display unit 121 assists in providing a user interface and displays different views of constructed multi-dimensional record structures.

The data storage modules include a multi-dimensional record structure storage unit 119, a metadata storage unit 118, and a display memory 120. The metadata storage unit 118 contains sets of rules that are provided by the user of the record management system 110. For each dimension that is to be included in the multi-dimensional record structure, the metadata rules enumerate all of the dimension values that are associated with the dimension. The rules also specify any hierarchical relationship that exists between different dimensions and their respective dimension values. This specification of hierarchical relationships requires a user to identify all hierarchical relationships between each dimension value in a set of related dimensions. These rules are entered by the user prior to instructing the system 110 to build a multi-dimensional record structure, since the system 110 employs the rules in forming the record structure.

The task of entering such highly detailed rules into the metadata storage unit 118 places a significant burden on the user. The user must be knowledgeable of all dimension records that will be incorporated into the record structure. Typically, users are aware of the dimensions that are relevant to a measure being provided in the record structure. However, the set of dimension values that make up each dimension is not always readily apparent to the user.

For example, in the record structure shown in FIG. 1(a), the user must provide the metadata storage unit 118 with each associated dimension value for the product dimension, year dimension, and region dimension. This may not appear difficult in light of FIG. 1(a), but the magnitude of the user's task is greatly increased if any dimension includes a great number of dimension values. This is a reality for many users, who wish to include a dimension in the record structure that may be comprised of hundreds or thousands of dimension values. A product dimension for a record structure being prepared to view sales measures in a large corporation could easily be made up of hundreds of product dimension values.

Further, the dimension values that are associated with a dimension can change over time. This prevents a standard metadata set of rules from being developed for continued use. For example, a set of product dimension values for a large company may change over time, as new products are introduced and old products are discontinued. The user of the record system 110 will have to know or learn all of the product dimension values that were in existence over the time period for which the product dimension is being represented in the record structure. In FIG. 1(a), this time period is only two years, but this time period could be extended to any number of years in many circumstances.

It is desirable to eliminate the need for the user of a multi-dimensional record management system to provide detailed listings of dimension values and relationships between particular dimension values. Such an elimination would decrease the time and effort required by the user to prepare a multi-dimensional view of a set of records.

The multi-dimensional record structure storage unit 119 stores the multi-dimensional record structure that is created by the system 110. The amount of memory required for storing such a structure can be very significant. In a traditionally formed structure, the number of measure cells is equal to the product of the number of dimension values associated with each of the dimensions. In FIG. 1(a), the number of measure cells is 12, which is calculated by multiplying the number of region dimension values (2), the number of year dimension values (2), and the number of product dimension values (3).

Forming such a structure is wasteful, if a dimension value associated with one dimension being represented on an axis does not coexist with another dimension value associated with another dimension being represented on the same axis. For example, in FIG. 1(a), stereo cell entries are provided for both 1995 and 1996 in both the East and West regions. If stereos were not an available product in 1995, then the record structure 90 contains two wasted memory locations (cells $91_3$, $91_6$). This is because the 1995 dimension value and stereo dimension value would not coexist in any record to characterize a sales measure value.

The East and West cell entries for stereo sales in 1995 (cells $91_3$, $91_6$) could therefore be eliminated, but there is no mechanism in a traditional record management system 110 to provide for such an elimination of cells. Although wasted memory due to the inclusion of two extraneous cells may not appear significant, the amount of wasted memory locations in the record structure can quickly multiply as the number of dimensions and dimension values increases.

The inclusion of unnecessary cell locations in the record structure also causes the time for constructing the record structure to be increased. For each unnecessary cell, the record management system 110 spends processing time determining that there is no measure value to be inserted into the cell. This extra time results in inconvenience and delay to the user, as well as unnecessary use of record management system resources. It would therefore be desirable to minimize the number of unnecessary cell locations in a multi-dimensional structure.

The display memory 120 is loaded with data representing different views of the record structure in the multi-dimensional record structure storage unit 119. The display unit 121 then displays the views that are stored in the display memory 120.

The processing engines include a query engine 114, record structure engine 115, display engine 116, and control engine 117. The control engine 117 provides for transferring information between the input control unit 112 and the rest of the system 110. The query engine 114 provides for performing a user specified query to retrieve data values and measure values from a data source.

The record structure engine 115 retrieves dimension values and measure values that are obtained from a data source in response to a query. The record structure engine 115 then maps the retrieved values into a multi-dimensional record structure in the multi-dimensional record structure storage unit 119. The record structure engine 115 constructs the multi-dimensional record structure based on inputs provided by the system's user and the rules in the metadata storage unit 118.

In traditional record management systems, such as system 110, the record structure engine 115 has been limited to building the record structure based on the results of only a single query. Further, once the record structure is formed, any records from an additional subsequent query cannot be incorporated into the existing record structure. In order to incorporate the records from an additional query, an entirely new record structure must be formed from the records returned by a single query that retrieves both the original records and the additional records.

The inability to incorporate additional query records into an existing record structure requires system users to anticipate all the measures and dimensions that may be desired for viewing prior to building the record structure. This often causes system users to include more dimensions and measures than are actually needed in a record structure to insure that no possible combination of relevant dimensions and measures are left out. The unused dimensions and measures wastefully consume memory in the record management system 110. Further, as a result of viewing the information in the record structure, the system user often wishes to view the measure values with respect to additional unanticipated dimensions. In traditional systems, this requires the construction of an entirely new record structure, which includes the unanticipated dimensions. This is undesirable, since the time required for building a traditional record structure can be extensive.

It would be desirable for the record management system to integrate records from a new query with records from an original query to augment an existing record structure. Such an augmentation would avoid the need for constructing an entirely new record structure from the two queries. Such an ability to augment would also avoid the need for building a very big record structure initially, since new dimensions and measures could be added at a later time.

The display engine 116 provides for retrieving user specified views of the record structure in the multi-dimensional record structure storage unit 119 and placing them in the display memory 120. The display engine 120 then provides for the views to be displayed to the user on the display unit 121. The views are limited to being slices of the record structure along planes in the record structure that are perpendicular to a record structure axis.

As a result, the display engine 116 is limited in the number of views that may be provided from the records returned by the query. Further, dimensions that are hierarchically related may not be viewed on opposite axes. This is because the traditional record structure engine 115 integrates hierarchically related dimensions into a single axis in the record structure. As stated above, the hierarchical relationship between both different dimensions and the dimension values in each dimension are entered into the metadata storage unit 118 by the system's user.

For example, the traditionally formed record structure 105 shown in FIG. 3 is the same as the record structure 90 shown in FIG. 1(a), except that record structure 105 includes a dimension for sales offices. The sales office dimension values include New York, Boston, San Francisco, and Seattle sales offices. The sales office dimension is hierarchically related to the region dimension, since it provides a more granular breakdown of each region dimension value. The user entered metadata will be required to include entries to reflect each of the following relationships: 1) the New York and Boston dimension values are hierarchically related to the East dimension value; and 2) the San Francisco and Seattle dimension values are hierarchically related to the West dimension value. Accordingly, the sales office dimension values are represented on the y-axis of the record structure 105 along with the region dimension values.

Due to the format of the record structure in FIG. 3, it is not possible to obtain a view 106 of the record structure as shown in FIG. 4. In FIG. 4, the measure cells are viewed so that they are characterized on a horizontal axis by the sales office dimension and on a vertical axis by the region dimension. This view is not possible, because the dimension on the horizontal axis is hierarchically related to the dimension on the vertical axis. No corresponding orthogonal slice of the traditionally formed record structure 105 in FIG. 3 can be made, because the region and sales office dimensions are on the same axis in the record structure 105.

It is desirable for the record management system's user to have more flexibility in viewing the records returned by a query. Given greater flexibility, the user would be able to view measure values that are characterized on any axis by any dimension, regardless of the dimension's hierarchical relation to any other dimension. As a result, a more flexible record management system would be able to generate the view 106 in FIG. 4.

Accordingly, it is desirable for a multi-dimensional record management system to provide for the display of records in a multi-dimensional format at higher speeds with reduced memory usage. It is also beneficial for the record management system to reduce the burden on the user of providing a metadata list of each dimension value associated with a dimension and the hierarchical relationship between each dimension value. Such a record management system may also provide for the augmentation of a multi-dimensional record view with records that are retrieved from a subsequent query. Finally, it is desirable for the record management system to provide for viewing measure records with respect to different dimensions, regardless of the hierarchical relationship between different dimensions.

SUMMARY OF THE INVENTION

A multi-dimensional record management system in accordance with the present invention generates a multi-dimensional view of records without constructing a multi-dimensional record structure. This provides for views to be created using less time and less memory than is required for the traditional generation of a multi-dimensional view.

In the absence of a traditional multi-dimensional record structure, multi-dimensional views may be generated in accordance with the present invention from records that are retrieved using multiple queries. As a result, the measures and dimensions provided in a view may be expanded by performing a new query to gather new measures or dimension values and augmenting existing information in the record management system. Such augmentation is not possible in a traditional record management system.

Further, a record management system in accordance with the present invention is able to generate views independent of hierarchical relationships between dimensions. The record management system also has no need to be instructed about any association between dimensions and dimension values. Accordingly, the user of the record management system is relieved of providing much information that is necessary to the operation of traditional multi-dimensional record management systems.

A record management system in accordance with the present invention provides for generating a multi-dimensional view for a number of different measures. A set of records that include measure values associated with the different measures is retrieved in response to a set of queries. A number of different dimension values are also represented throughout the set of records, and each one of the dimension values is associated with at least one of a number of different dimensions.

The record management system maintains the set of records in a master table. A record structure foundation is generated to reflect the contents of the master table. In one embodiment of the present invention, the record structure foundation includes a master table index and a query map. The query map includes a query map record for each query in the set of queries. A query map record identifies a query and the dimensions and measures called for by the query.

The master table index includes dimension index records. Each dimension index record identifies a dimension value from the master table, an associated dimension, and each record in the master table that contains the dimension value.

The record management system uses the master table index to generate a multi-dimensional layout mapping for the measures to be viewed. The layout mapping includes a set of cells that are arranged with respect to a set of axes. A set of dimensions is represented on each axis, and each axis includes a set of groups of records from the master table. Each cell corresponds to a group on each axis. Each group of records on an axis includes records that contain a dimension value from each dimension represented on the axis. Each group contains at least one record, because no groups are assigned for dimension values that do not coexist in any record.

Once a layout mapping is generated, the record management system converts the layout mapping into a multi-dimensional view. For each cell in the layout mapping, measure results are determined based on the measure values in the records in each group corresponding to the cell. The measure results are loaded into the cells, and the multi-dimensional view is displayed.

A record management system in accordance with the present invention may include data storage units for implementing the master table, query map, master table index, and layout mapping. In order to perform the operations that are carried out in generating a multi-dimensional view, the record management system may also include a control engine, query engine, index engine, and layout engine. These processing engines and data storage units may be coupled together by a system bus to provide for the transfer of data between different components in the record management system.

The operations performed by the processing engines may be stored in the form of program code instructions in data storage mediums within the record management system, such as memory and mass storage devices. Alternatively, such program code instructions may be maintained on a portable storage medium and loaded into the record management system.

BRIEF DESCRIPTION OF THE DRAWINGS

Further details of the present invention are explained with the help of the attached drawings in which:

FIGS. 1(a)–1(b) illustrate a traditional multi-dimensional record structure.

FIG. 7(a) illustrates the state of the master table shown in FIG. 5 after the master table is updated to account for a response from a first query that is submitted to a database management system by the record management system shown in FIG. 5.

FIG. 7(b) illustrates the state of the query map shown in FIG. 5 after the query map is updated to account for the first query.

FIG. 7(c) illustrates the state of the master table index shown in FIG. 5 after the master table index is updated to account for the first query.

FIG. 8 illustrates a layout mapping created by the record management system shown in FIG. 5.

FIG. 9 illustrates a multi-dimensional view generated by the record management system shown in FIG. 5.

FIG. 10(a) illustrates the state of the master table shown in FIG. 5 after the master table is updated to account for a response from a second query that is submitted to a database management system by the record management system shown in FIG. 5.

FIG. 10(b) illustrates the state of the query map shown in FIG. 5 after the query map is updated to account for the second query.

FIG. 10(c) illustrates the state of the master table index shown in FIG. 5 after the master table index is updated to account for the second query.

FIG. 11 illustrates a layout mapping created by the record management system shown in FIG. 5.

FIG. 12 illustrates a multi-dimensional view generated by the record management system shown in FIG. 5.

FIG. 13 illustrates a layout mapping created by the record management system shown in FIG. 5.

FIG. 14 illustrates a multi-dimensional view generated by the record management system shown in FIG. 5.

FIG. 15(a) (Part 1 and Part 2) illustrates the state of the master table shown in FIG. 5 after the master table is updated to account for a response from a third query that is submitted to a database management system by the record management system shown in FIG. 5.

FIG. 15(b) illustrates the state of the query map shown in FIG. 5 after the query map is updated to account for the third query.

FIG. 15(c) illustrates the state of the master table index shown in FIG. 5 after the master table index is updated to account for the third query.

FIG. 16 illustrates a layout mapping created by the record management system shown in FIG. 5.

FIG. 17 illustrates a multi-dimensional view generated by the record management system shown in FIG. 5.

FIG. 18 illustrates a layout mapping created by the record management system shown in FIG. 5.

FIG. 19 illustrates a multi-dimensional view generated by the record management system shown in FIG. 5.

DETAILED DESCRIPTION

A. Multi-Dimensional Record Management System

Figure 1A:
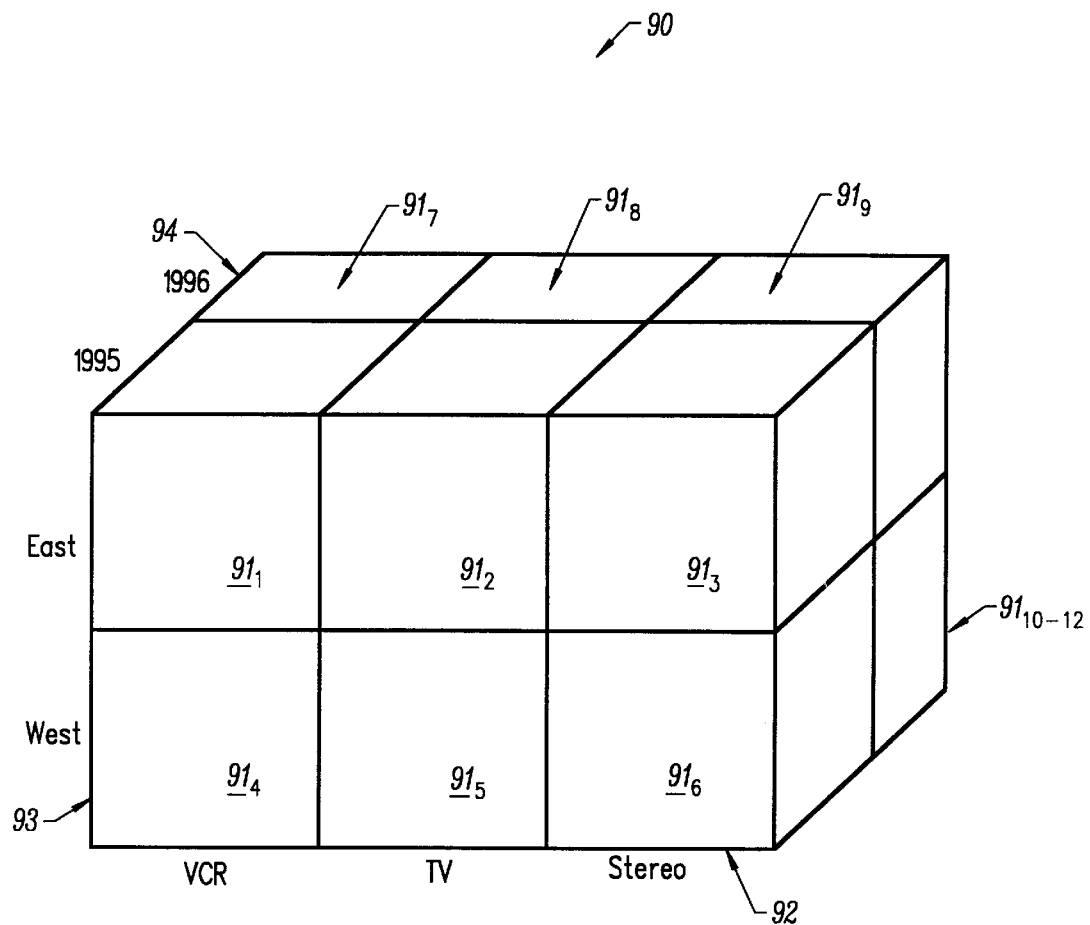
Figure 2:
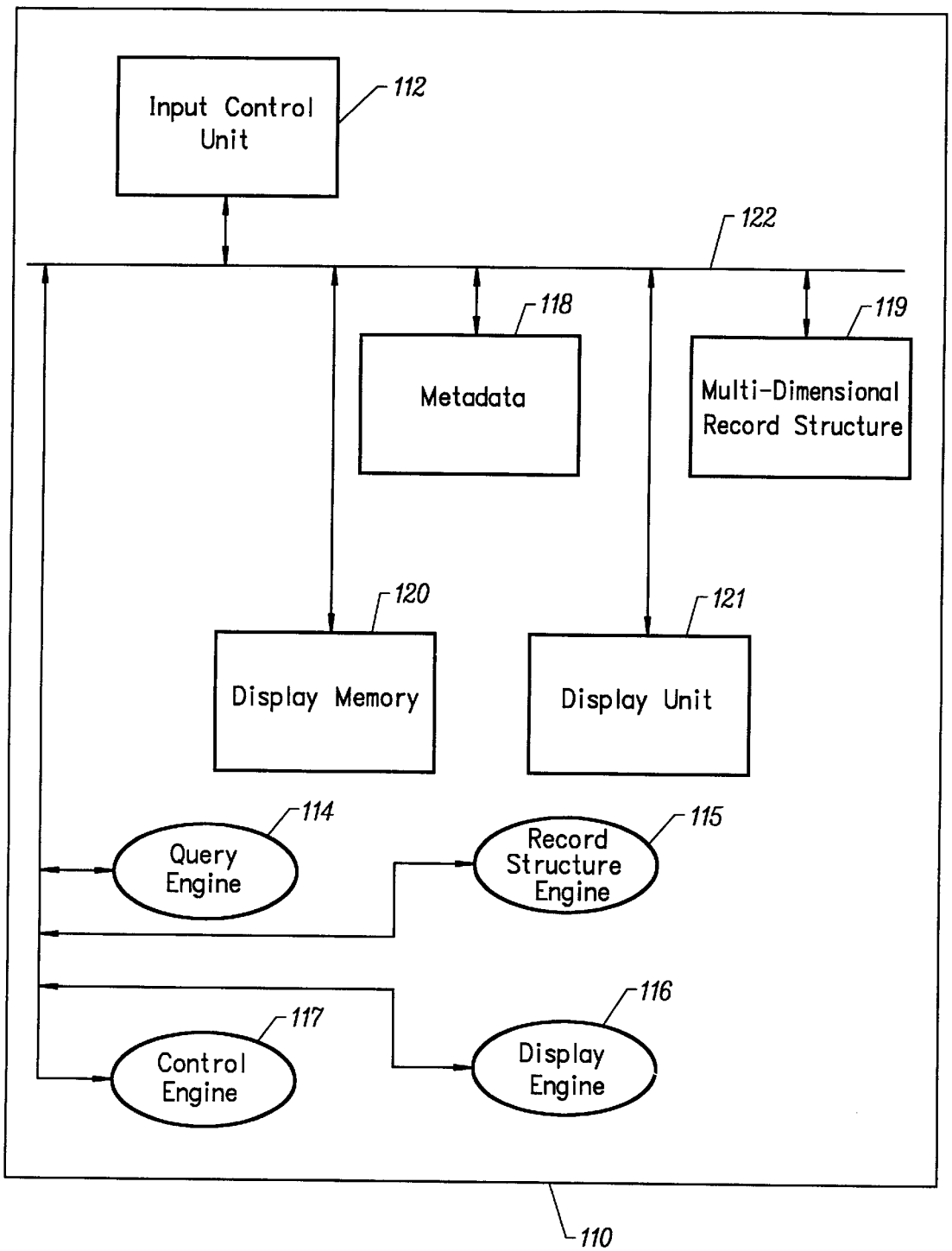
FIG. 2 illustrates a conventional multi-dimensional record management system.
Figure 3:
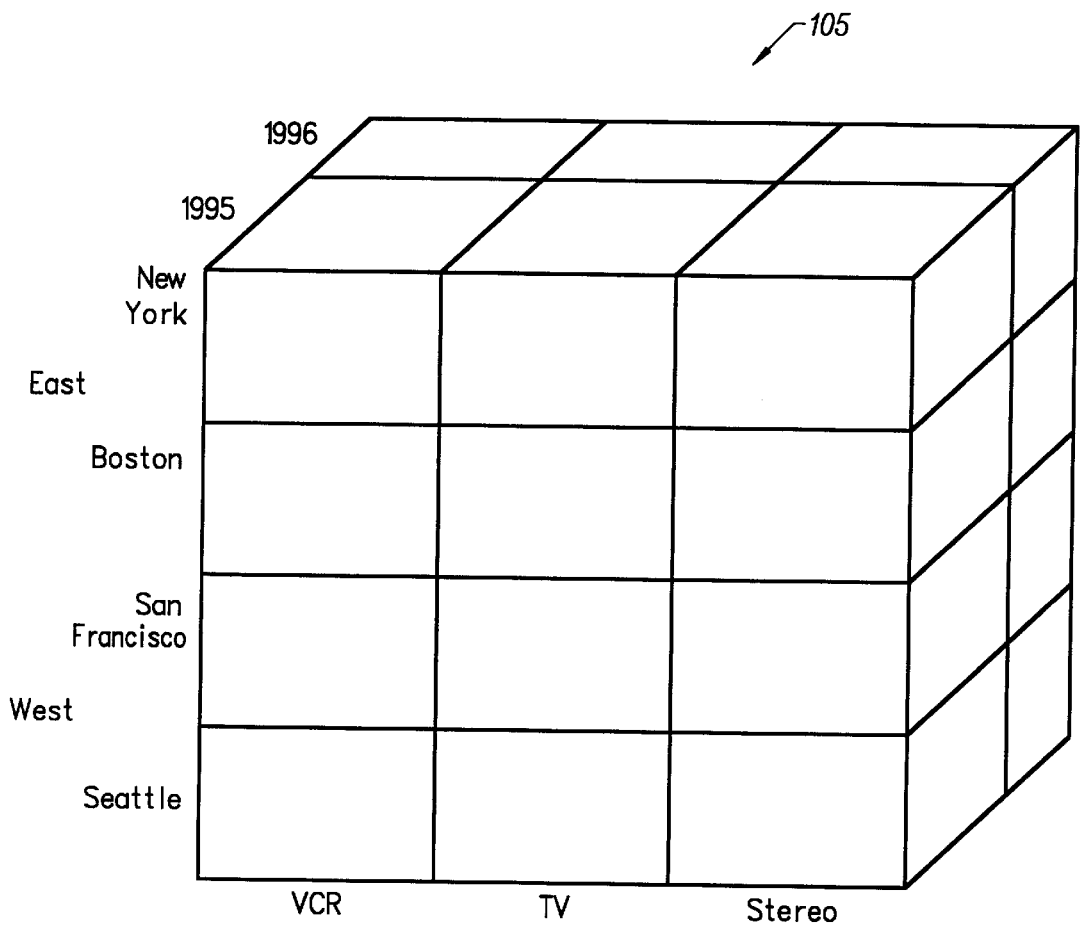
FIG. 3 illustrates a traditional multi-dimensional record structure built by the multi-dimensional record management system shown in FIG. 2.
Figure 4:
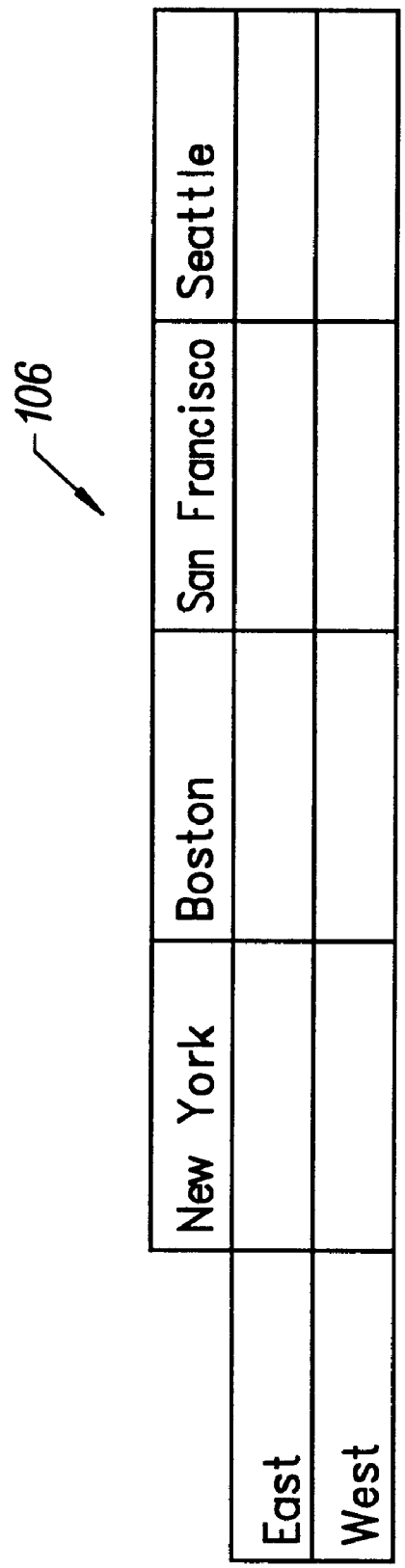
FIG. 4 illustrates a multi-dimensional view that cannot be obtained from the traditional multi-dimensional record structure shown in FIG. 3.
Figure 5:
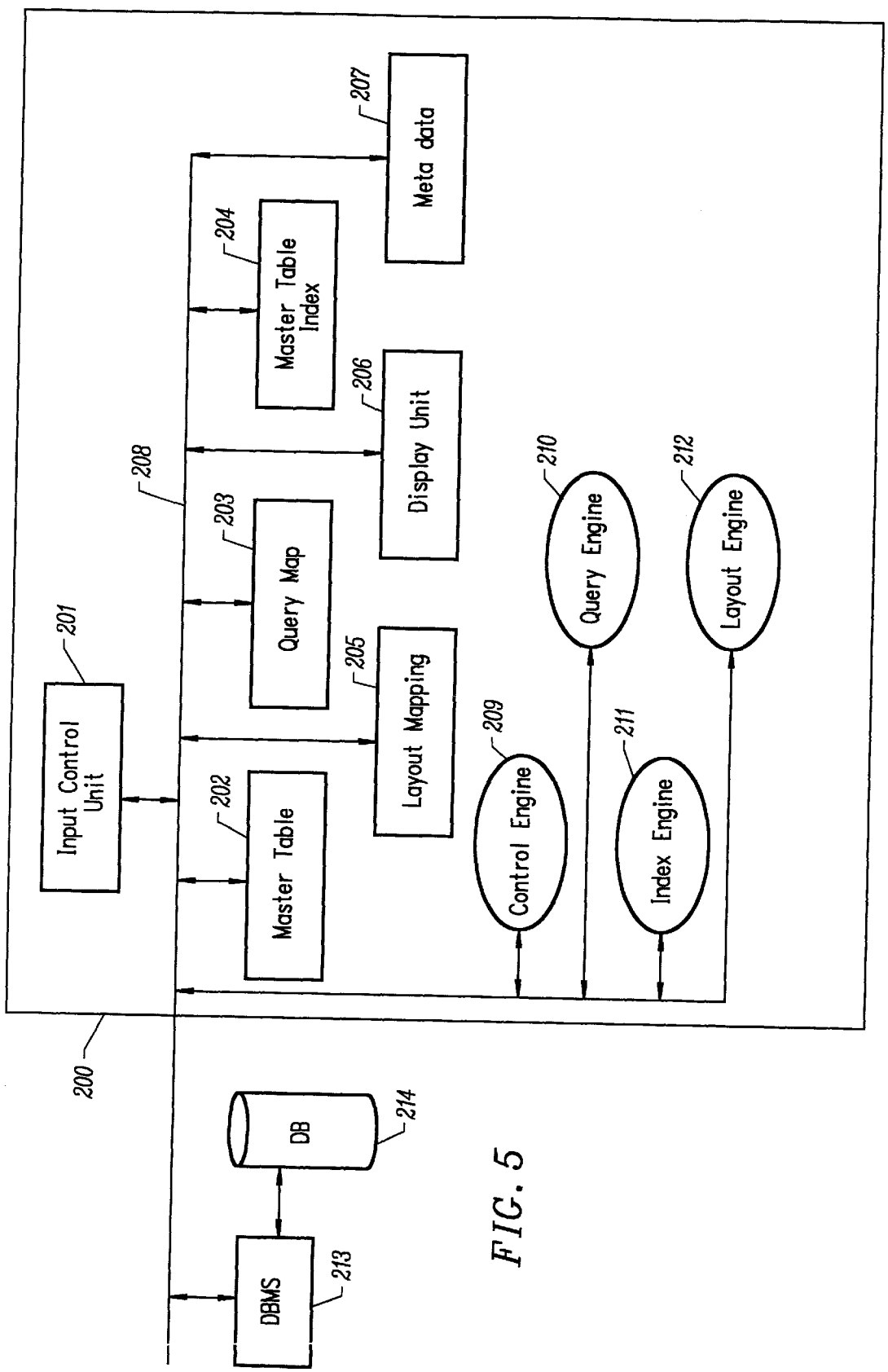
FIG. 5 illustrates a multi-dimensional record management system in accordance with the present invention.

FIG. 5 illustrates a multi-dimensional record management system 200 in accordance with the present invention. The record management system 200 eliminates the need for constructing a traditional multi-dimensional record structure. Instead, a multi-dimensional record structure foundation is generated. Utilizing this foundation, the record management system 200 is able to generate multi-dimensional views of measure values.

Both the record structure foundation and multi-dimensional views may be formed independent of hierarchical relationships between different dimension values. Further, there is no need to inform the record management system 200 of the dimension values associated with each dimension. Accordingly, the user of the record management system 200 is relieved of providing such detailed dimension record information to the record management system.

By employing the record structure foundation, multi-dimensional views can be generated to include records that are retrieved using multiple queries. Additionally, the record structure foundation may be augmented with records that are retrieved from additional queries made after the record structure foundation is initially formed This avoids the need to build an entirely new record structure foundation when views are expanded to include records from new queries. The record management system's implementation of the record structure foundation also enables multi-dimensional views to be generated faster and with the use of less memory than in traditional multi-dimensional record management systems.

The record management system 200 shown in FIG. 5 includes a system bus 208 that couples together an input control unit 201, a set of data storage units 202, 203, 204, 205, 207, a display unit 206, and a set of processing engines 209, 210, 211, 212.

The data storage units include a master table storage unit 202, a query map storage unit 203, a master table index storage unit 204, a layout mapping storage unit 205, and a metadata storage unit 207. The processing engines include a control engine 209, a query engine 210, an index engine 211, and a layout engine 212. Each processing engine may be implemented by having a processor unit execute processor readable instructions stored in a computer readable medium, such as a memory. In one embodiment of the present invention, different processor units may be employed for each engine. Alternatively, a single processor unit may be used to implement all of the engines or a set of the engines.

The record management system 200 is coupled to a database management system 213, which is linked to a database 214. The database 214 contains records that are to be used by the record management system 200 in providing multi-dimensional views. The database management system 213 extracts records from the database 214 in response to queries.

In one embodiment of the present invention, the system bus 208 may be extended outside of the record management system 200 and coupled to the database management system 213. Alternatively, the record management system 200 may include a communications peripheral (not shown) which couples the database management system 213 to the record management system 200. The communications peripheral may couple the record management system 200 and the database management system 213 via a communications medium, such as a local area network, serial or parallel port interface, or another suitable communications medium.

The input control unit 201, control engine 209, and display unit 206 combine to provide a user interface. The input control unit 201 enables a user of the record management system 200 to provide instructions to the system 200 via an input device, such as a keyboard, mouse, trackball or other suitable mechanism. The display unit 206 provides for displaying information to a system 200 user, such as multi-dimensional views and prompts for instructions. The control engine 209 controls the operation of the input control unit 201 and the display unit 201 as well as the transfer of information between the input control unit 201 and the rest of the system 200.

The master table storage unit 202 provides for maintaining records that are to be used by the record management system 200 in generating multi-dimensional views. The records maintained in the master table storage unit 202 may either be stored directly in the master table storage unit 202 or in a memory location (not shown) that is addressable based on a pointer that is stored in the master table 202.

The records being maintained by the master table 202 are records that have been retrieved from the database 214 via the database management system's response to a set of queries. In accordance with the present invention, a query may call for records that include values associated with a set of measures and values associated with a set of dimensions. The dimension values in a record characterize the measure values in the record. Query requirements may be provided to the record management system 200 by the system's user. The user interface formed by the input control unit 201, control engine 209, and display unit 206 facilitate the retrieval of query requirements from a user. The query requirements are transferred to the query engine 210, which submits queries to the database management system 213.

In response to a query, the database management system 213 extracts records from the database 214 that conform to the measure and dimension requirements called for in the query. The database management system 213 then transfers the extracted records to the record management system 200. In the record management system 200, the query engine 210 receives the extracted records and transfers them to the master table 202 to be maintained. For each of the retrieved records, the master table 202 provides an indication of the query that yielded the record.

The query engine 210 also generates a record of the queries that have been submitted to the database management system 213. The record of queries is maintained in the query map storage unit 203. In the query map 203, each query that is submitted to the database management system 213 is recorded in a query map record. Each query map record identifies a query that has been submitted and the subject matter that was called for by the query. Accordingly, a query map record identifies a query and the dimensions and measures called for in the query.

In addition to creating the query map 203, the record management system 200 generates a master table index in storage unit 204. The master table index 204 contains dimension index records. Each dimension index record identifies the following: 1) a dimension value that is associated with one of the dimensions called for in the queries; 2) records in the master table 202 that contain the dimension value; and 3) the dimension associated with the dimension value.

The index engine 211 is responsible for generating and updating the master table index 204. After new records are placed in the master table 202 in response to a new query, the index engine 211 reviews each new record. If the index engine encounters a dimension value that does not already have a corresponding index record, then a new dimension index record is created for the dimension value. If the index engine encounters a dimension value that already has a corresponding dimension index record, then the existing dimension index record is updated to account for the new record.

The query map 203 and master table index 204 combine to form the multi-dimensional record structure foundation. Once the query map 203 and master table index 204 are created, there is no need to build a traditional multi-dimensional record structure to obtain multi-dimensional views of the records in the master table 202. The record structure foundation enables records in the master table 202 to be identified and extracted for display in a user formatted multi-dimensional view.

This is beneficial, because the processing time and memory space required to build the query map 203 and master table index 204 are less than the time and memory resources required to construct a traditional multi-dimensional record structure. As will be explained in greater detail below, the use of the record structure foundation, instead of a traditional record structure, reduces the amount of wasted cells in memory. Further, both the query map 203 and master table index 204 may be augmented to account for subsequent additional queries that provide records to the master table 202. In traditional multi-dimensional record structures, such augmentation is not possible.

For example, the record management system 200 is able to generate a first multi-dimensional view of records that are retrieved in response to a first query, once the query map 203 and master table index 204 are updated to account for the first query. Next, the record management system 200 can have a second query performed and update the query map 203 and master table index 204 to account for the second query. A second multi-dimensional view can then be generated using records retrieved in the first query and second query. This contrasts sharply with the traditional practice of only forming multi-dimensional views of records that are retrieved in response to a single query.

The layout engine 212 and layout mapping storage unit 205 are employed to generate a multi-dimensional view based on the data in the query map 203 and master table index 204. In order to generate a multi-dimensional view, the layout engine 212 creates a layout mapping of cells in the layout mapping storage unit 205. The layout engine 212 then converts the layout mapping into a view. The view may be displayed to the record management system's user by the display unit 206.

A layout mapping is a shell for a view or portion of a view that is to be generated by the record management system 200. The layout mapping includes a set of cells that are organized to correspond to different groupings of records from the master table. Each grouping of records characterizes a set of cells within the layout mapping.

The organization of the layout mapping is dictated by a user defined set of formatting information, which identifies the following: 1) measures that are to be represented in the layout mapping's cells; 2) the number of axes in the multi-dimensional view; 3) dimensions that are to be used to characterize the measures; 4) an assignment of specific dimensions to different axes in the view; and 5) operations to be performed in determining measure results to be placed in the cells for each measure The layout engine 212 utilizes the user-defined formatting information and the information in the record structure foundation to generate the layout mapping. The generation of the layout mapping will be described in greater detail below.

Once the layout mapping is generated, the layout engine 212 utilizes the information created in the generation of the layout mapping and the user's formatting information to create a multi-dimensional view. The layout engine 212 generates an axis display for each axis of the view. Each axis display correlates a set of cells to a combination of dimension values. The layout engine 212 also determines which records in the master table 202 include measure values that are to be employed in generating the multi-dimensional view. The measure values in these records are then retrieved by the layout engine 212 and used to determine measure results. Each measure result is loaded into a corresponding cell in the layout mapping storage unit 205. Once the axis displays are formed and the cells are loaded, the display unit 206 displays the view that is provided from the converted layout mapping.

The metadata storage unit 207 contains information to assist the user of the record management system 200 in selecting a formatting for the multi-dimensional view. Unlike the metadata in a traditional multi-dimensional record management system, the metadata 207 in the record management system 200 shown in FIG. 5 is not employed by the system 200 in generating a multi-dimensional view. In accordance with the present invention, the metadata storage unit 207 contains information about the data in the database 214.

Such information may include a list of dimensions represented in the database 214, hierarchical relationships between the dimensions, and measures that are represented in the database 214. The metadata 207 may also include a listing of the operations that the record management system 200 may be instructed to perform in determining measure results. Further information about the record management system 207 and database 214 may also be provided in the metadata 207.

When the record management system 200 has to collect view formatting information, the system 200 displays the metadata 207 to the user. This enables the user to be aware of the options that are available. The metadata 207 may also be displayed to the user when the system 200 is gathering query requirements from the user.

When assembling a query or generating a multi-dimensional view, the record management system 200 operates in response to the user provided information and does not access the metadata. Accordingly, the metadata 207 does not need to contain the detailed dimension value information that is required in traditional record management systems. This relieves the user of the record management system from having to identify each dimension value and all relationships that exist between dimension values.

B. Record Management System Operation

Figure 6A:
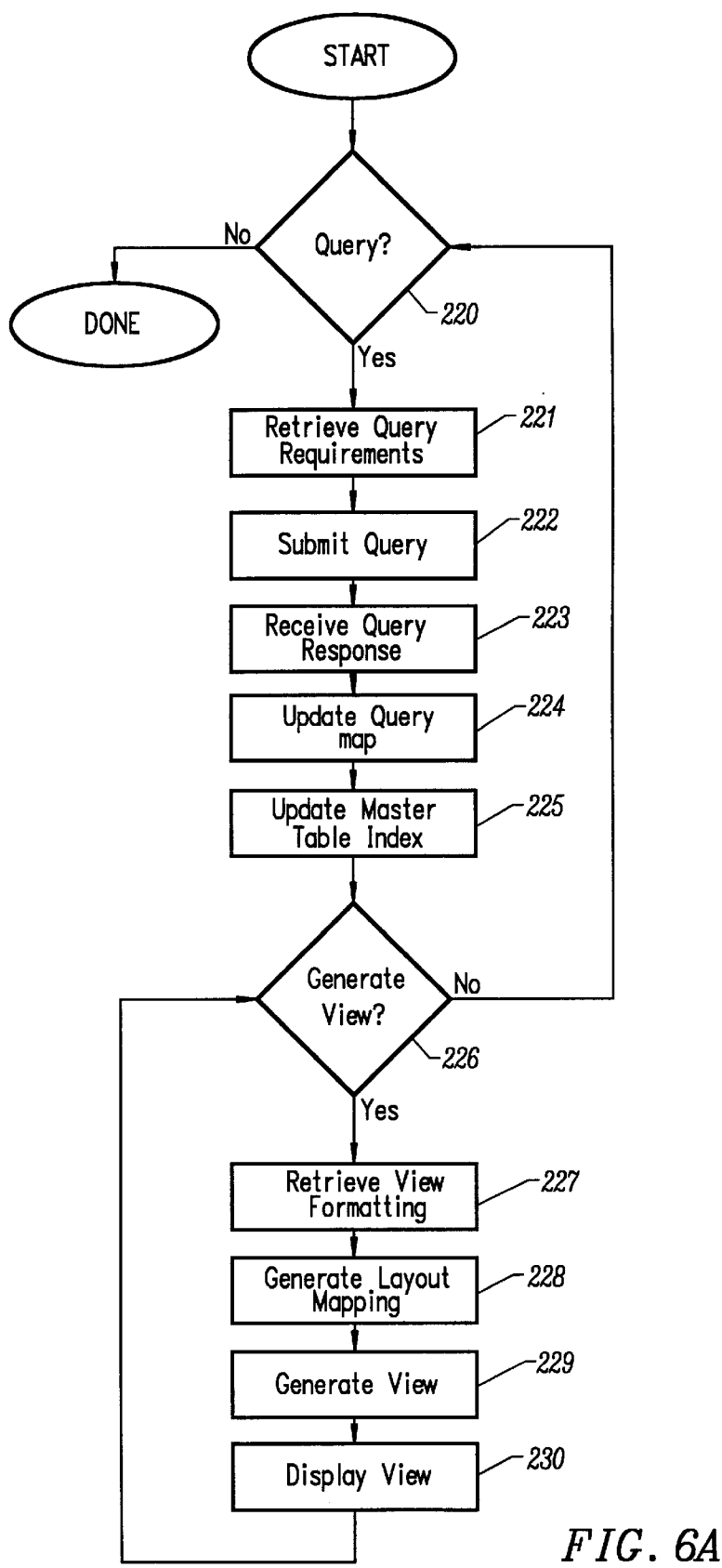
FIG. 6(a) illustrates a sequence of operations performed by the record management system shown in FIG. 5 to generate a multi-dimensional view.

FIG. 6(a) illustrates a sequence of operations that may be performed to generate a multi-dimensional view of records in accordance with the present invention. By way of non-limiting example, the sequence of operations will be described with reference to specific sets of queries and records. One with ordinary skill in the art will recognize that embodiments of the present invention may be employed with many different sets of queries and records.

1. Record Structure Foundation

When generating a multi-dimensional view, the record management system 200 determines, in step 220 (FIG. 6(a)), whether the record management system's user wishes to have a query performed. If no query is desired, the process of generating multi-dimensional views is completed. If a query is to be performed, the record management system 200 obtains an input from the user in step 221 that indicates the dimensions and measures that are to be called for by the query operation. The control engine 209 and input control unit 201 may combine to collect this information from the user.

Once the desired measures and dimensions are retrieved, they are transferred to the query engine 210, which submits a query request to the database management system 213 in step 222. The query request instructs the database management system 213 to extract records from the database 214 that contain values associated with the dimensions and measures called for in the query request. The database management system 213 extracts such records from the database 214 and provides them to the record management system 200.

The query engine 210 receives the records provided by the database management system 213 and provides for them to be maintained in the master table 202 in step 223. Upon maintaining the records in the master table 202, an indication is provided in the master table 202 that identifies each of the newly entered records. This indication may be the address of the records in the master table, a query and record number that is entered in the master table, or another form of identifier.

For example, a user may wish to have a query performed in which records are retrieved that relate to the dollar value of product sales in different regions of the United States in different years. Accordingly, a corresponding query request is issued by the query engine 210 to the database management system 218 in step 222. The query request causes the database management system 213 to find and return records that include values associated with a year dimension, region dimension, product dimension, and dollar sales measure.

As shown in FIG. 7(a), the records $301_{1-10}$ that are returned by the database management system 213 are received by the query engine 210 and maintained in the master table 202 in step 223. In the master table 202 shown in FIG. 7(a), ten records $301_{1-10}$ are maintained from the database management system's response to the above-identified query. This query will be referred to as Query 1 ("Q1"). Each record $301_{1-10}$ includes the following: 1) a dimension value that is associated with a year dimension ("Year"); 2) a dimension value that is associated with a region dimension ("Region"); 3) a dimension value that is associated with a product dimension ("Product"); and 4) a measure value that is associated with a dollar sales measure ("Sales($)") Each record set is identified by its query number (Q#), which is Q1 in this case, and a record number (R#).

1995 and 1996 are dimension values associated with the year dimension. Video cassette recorder ("VCR"), television ("TV"), and stereo are dimension values associated with the product dimension, and East and West are dimension values associated with the region dimension. The dollar amount in each record $301_{1-10}$ is a measure value associated with the Sales($) measure.

As shown in the records $301_{1-10}$ from Query 1, the database 214 contained dollar sales measure values for the years 1995 and 1996 in the East and West regions of the United States. Dollar sales measure values are available for video cassette recorders and televisions in each region in both 1995 and 1996, but dollar sales measure values are available for stereos only in 1996 in both the East region and West region. No dollar sales measure values for stereos exist for 1995.

In response to newly received records from a query, the record management system 200 updates the query map 203, in step 224 (FIG. 6(a)), so that it contains a record of the most recently performed query. The query map 203 is updated by the query engine 210 creating a record in the query map 203 that identifies the most recent query and each of the dimensions and measures that are called for in the most recent query.

For example, FIG. 7(b) shows a record 311 that is added to the query map 204 to correspond to Query 1. The query map record 311 that is added for Query 1 identifies Query 1 and lists each of the dimensions and measures that are called for in Query 1. Accordingly, the dimensions listed are Year, Region, and Product, and the measure listed is Sales($).

In addition to updating the query map 203, the record management system 200 updates the master table index 204 in step 225 to account for the newly received records from a query. The index engine 211 is responsible for generating and updating index records in the master table index 204. The index engine 211 ensures that an updated dimension index record exists for each dimension value in a newly received set of records.

Each dimension index record identifies a dimension value and the records in the master table 202 that include the dimension value. Each dimension index record also preferably includes an indication of the query that provided each of the identified records. In further embodiments of the present invention, each dimension index record identifies a dimension that is associated with the dimension value in the index record.

For example, a newly received set of records from a query may have N different dimension values representing D dimensions throughout the records. Each of the N different dimension values is referenced to using the nomenclature "dimension_value$_n$", wherein n is an integer in a range of 1 to N and dimension_value$_n$ refers to a nth dimension value in the set of N dimension values. Additionally, the set of records may include measure values representing M measures throughout the records. The index engine 211 updates the master table index 204 to account for each of the N dimension values.

In updating the master table index 204 for one of the dimension values in the N dimension values, for example dimension_value$_n$, the index engine 211 identifies records in the newly received set of records that include the dimension_value$_n$. If the master table index 204 does not already include a dimension index record for the dimension_value$_n$, then the index engine 211 creates a new dimension index record for the dimension_value$_n$. If a dimension index record already exists for the dimension_value$_n$, then this dimension index record is updated to identify the records in the new set of records that include the dimension_value$_n$. The above-described process is performed N times with n being a different integer value in the range of 1 to N each time, wherein N is an integer. As a result, the master table index 204 is updated with respect to each of the N dimension values, namely dimension_value$_1$–dimension_value$_N$.

Figure 6B:
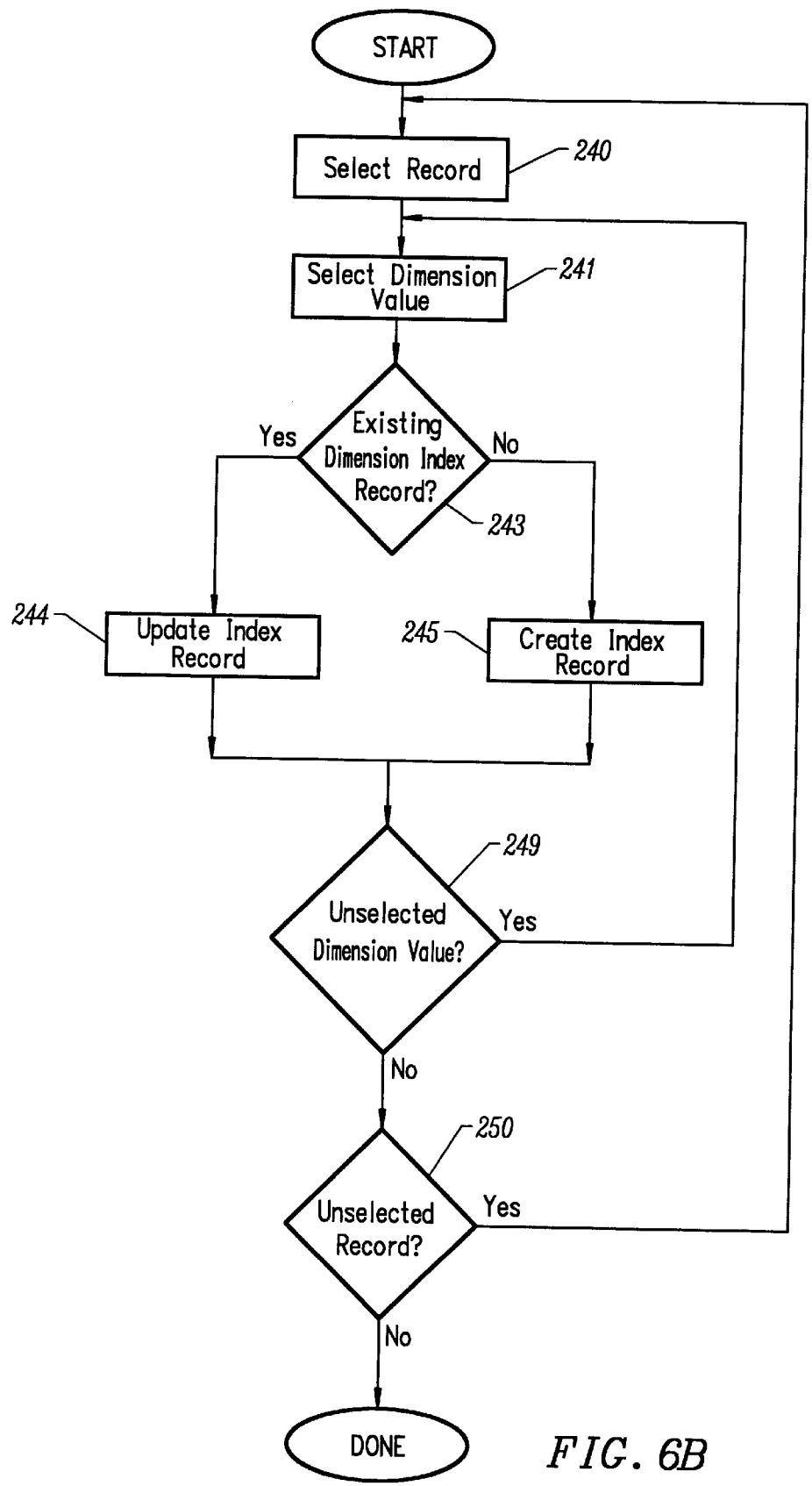
FIG. 6(b) illustrates a sequence of operations performed by the record management system shown in FIG. 5 to generate an index.

FIG. 6(b) illustrates a sequence of operations that may be performed by the index engine 211 to update the master table index 204 in step 225 in response to a newly received set of records from a query. First, the index engine 211 selects a record in the newly received set of records in step 240. Next, the index engine 211 selects a dimension value in the selected record in step 241.

For the selected dimension value, the index engine 211 determines, in step 243, whether a corresponding dimension index record already exists in the master table index 204. If a corresponding dimension index record already exists for the dimension value, then the existing dimension index record is updated in step 244 to identify the selected record. Additionally, the existing dimension index record is updated to identify the query that produced the selected record. If a corresponding dimension index record does not exist for the dimension value, a new corresponding dimension index record is created in step 245. The new dimension index record identifies the dimension associated with the dimension value, the dimension value, the selected record, and the query that produced the selected record.

After a new dimension index record has been created (step 245) or an existing dimension index record has been updated (step 244) the index engine 211, in step 249, determines whether any dimension values in the selected record have not yet been selected. If any dimension value has not yet been selected, then the index engine 211 selects another dimension value from the selected record in step 241 and repeats the above-described operation. If all of the dimension values in the selected record have been selected, then the index engine 211, in step 250, determines whether any record in the newly received set of records has not yet been selected. If any record remains unselected, the index engine 211 selects a new record in step 240 and repeats the above-described process. Otherwise, the master table index 204 has been completely updated to account for the newly received records, and step 225 is done.

FIG. 7(c) illustrates index records $320_{1-7}$ that are added to the master table index 204 in response to the records retrieved in response to Query 1. Since Query 1 is the first query performed by the record management system 200, no index records existed in the master table index 204 prior to the master table index 204 being updated in response to Query 1. As shown in FIG. 7(c), a dimension index record $320_{1-7}$ has been created for each of the dimension values in Query 1.

In addition to identifying a dimension value, each dimension index record $320_{1-7}$ identifies the master table records which contain the identified dimension value. Each dimension index record $320_{1-7}$ also identifies the query (Q1) that produced the identified records and the dimension that is associated with the dimension value. For example, the dimension index record 320, for the 1995 dimension value identifies the associated year dimension (Year) and records 1–4 in Query 1 (Q1: 1–4), which each contain the 1995 dimension value.

In updating the master table index 204 (step 225 (FIG. 6(a)) shown in FIG. 7(c), the record management system 200 performs the sequence of operations shown in FIG. 6(b). For example the index engine 211 selects (240) record one ($301_1$ (FIG. 7(a)) from Query 1 in the master table 202. The index engine 211 then selects (241) in the 1995 year dimension value in record one $301_1$. The index engine determines (243) that no dimension index record exists for 1995 in the master table index 204 and creates (245) a dimension index record ($320_1$ (FIG. 7(c)) for the 1995 dimension value. As shown in FIG. 7(c), the newly created record 320, identifies the 1995 dimension value, the Year dimension and record one in Query 1 (Q1: 1).

Next, the index engine 211 determines (249) that there are unselected dimension values in the selected record $301_1$ and selects (241) the East dimension value. The index engine 211 determines (243) that the East dimension value does not have a dimension index record and creates (245) a corresponding dimension index record $320_3$ in the master table index 204 shown in FIG. 7(c). This new index record $320_3$ identifies the East dimension value, the Region dimension, and record one of Query 1 (Q1:1).

The index engine 211 continues by determining (249) that the VCR dimension value is unselected in record $301_1$. The index engine 211 selects (241) the VCR dimension value and determines (243) that no index record exists for this value. Accordingly, a dimension index record $320_5$ (FIG. 7(c)) is created (245) for the VCR dimension that identifies the VCR dimension value, the Product dimension and, record one of Query 1 (Q1:1). The index engine 211 then determines (249) that all dimension values in record $301_1$ have been selected and further determines (250) that other records have not yet been selected. As a result, a new record is selected (240) and the above described process is repeated for the newly selected record.

2. Multi-Dimensional Views

Once the query map 203 and master table index 204 are updated, thereby completing the update of the record structure foundation, a multi-dimensional view of records may be generated. Unlike in traditional processes for generating multi-dimensional views, there is no need to construct a multi-dimensional record structure. Embodiments of the present invention provide for independently creating each desired multi-dimensional view, as opposed to merely displaying slices within a single traditional multi-dimensional record structure that cannot be augmented. The augmentable record structure foundation, which is formed by the query map 203 and master table index 204, is employed to independently create these views. This provides enhanced flexibility in the formatting of views, as well as the ability to efficiently generate views based on multiple queries.

Before a multi-dimensional view is created, the record management system 200 determines, in step 226 (FIG. 6(a)), whether the user wishes to have a view created. The input control unit 201, control engine 209 and display 206 combine to provide the user with an interface for indicating whether a multi-dimensional view is to be generated. If the user does not wish to have a view created, then the record management system 200 determines, in step 220, whether any additional queries are to be performed. If a view is to be created, the record management system 200 proceeds to gather formatting information for generating the view in step 227. The formatting information may also be retrieved from a user through the combined operation of the control engine 209, input control unit 201, and display unit 206.

The formatting information includes the number of axes that the view will include and the dimensions that are to be represented on each axis. The formatting information also identifies a desired measure that is to be characterized by the axis dimensions and any operations that are to be employed in determining measure results for the view. Such operations may include the summing, averaging, or listing of measure values.

For example, a user may specify that a multi-dimensional view have two axes. On a vertical axis, B number of dimensions are to be represented, and on a horizontal axis D number of dimensions are to be represented. The user then specifies a measure to be characterized by the dimensions on the vertical axis and horizontal axis. In order to determine measure results, measure values that are characterized by the same dimension values for the specified measure are to be listed.

Once the formatting information is gathered, the record management system proceeds with the generation of a layout mapping in step 228 (FIG. 6(a)). The layout engine 212 builds the layout mapping in the layout mapping storage unit 205 by utilizing the retrieved formatting information and the record structure foundation formed by the query map 203 and master table index 204.

Figure 6C:
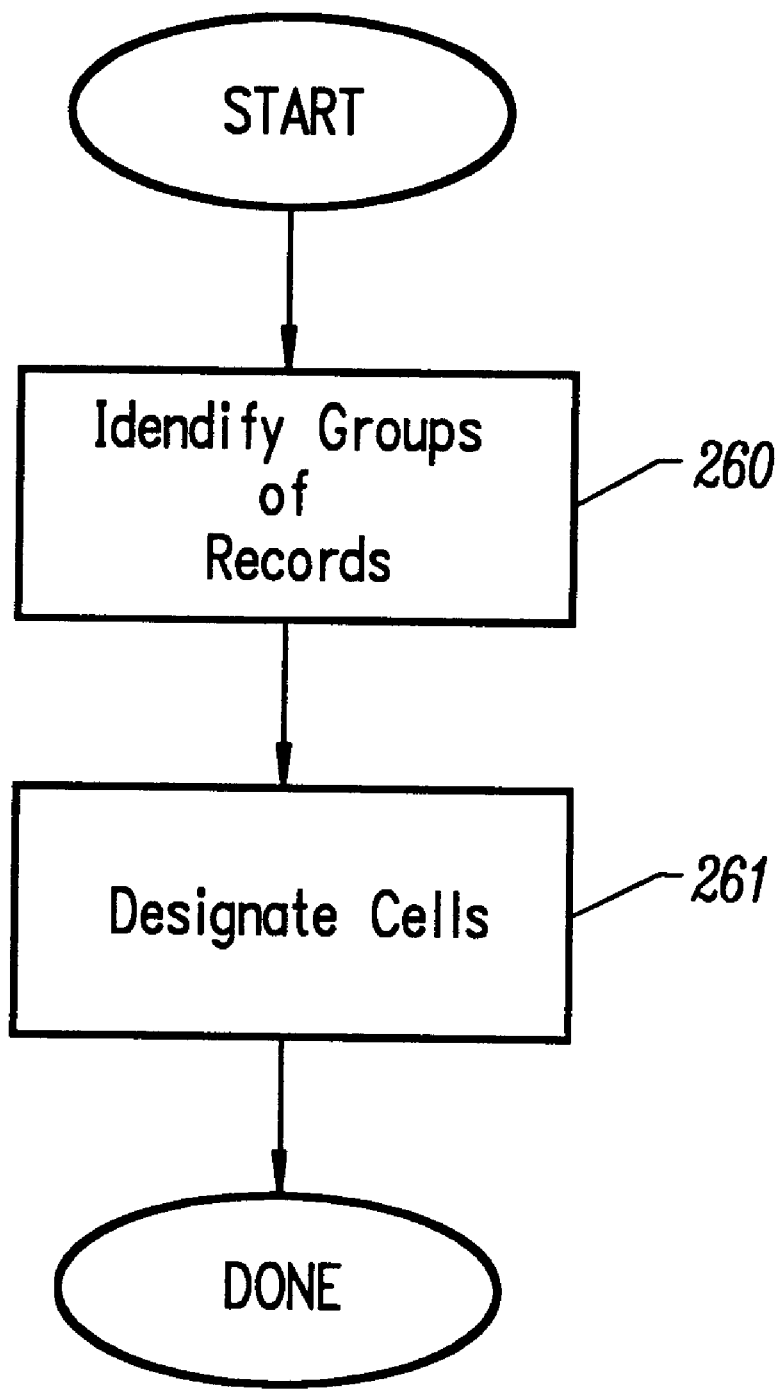
FIG. 6(c) illustrates a sequence of operations performed by the record management system shown in FIG. 5 to generate a layout mapping.

FIG. 6(c) illustrates a sequence of operations that may be performed by the record management system 200 in generating a layout mapping in step 228. For each axis in the desired view, the layout engine 212 identifies a set of groups of records in step 260. Each group of records includes records from the master table 202 that contain a specified dimension value from each of the dimensions being represented on the axis. Each group corresponds to a unique combination of dimension values, with each dimension value being from a different one of the axis' dimensions. However, each group is required to comprise at least one record that appears in the master table 202. A group may not consist of no records or be an empty set. Additionally, each record in each group includes at least one measure value that is associated with the measures being characterized in the desired view.

The layout engine 212 also designates cells in memory locations in the layout mapping storage unit 205 in step 261. The cells will later be filled with measure results for the measure being characterized in the view. The cells are designated to correspond to the groups of records on each axis. Each cell corresponds to a group on each axis.

Figure 6D:
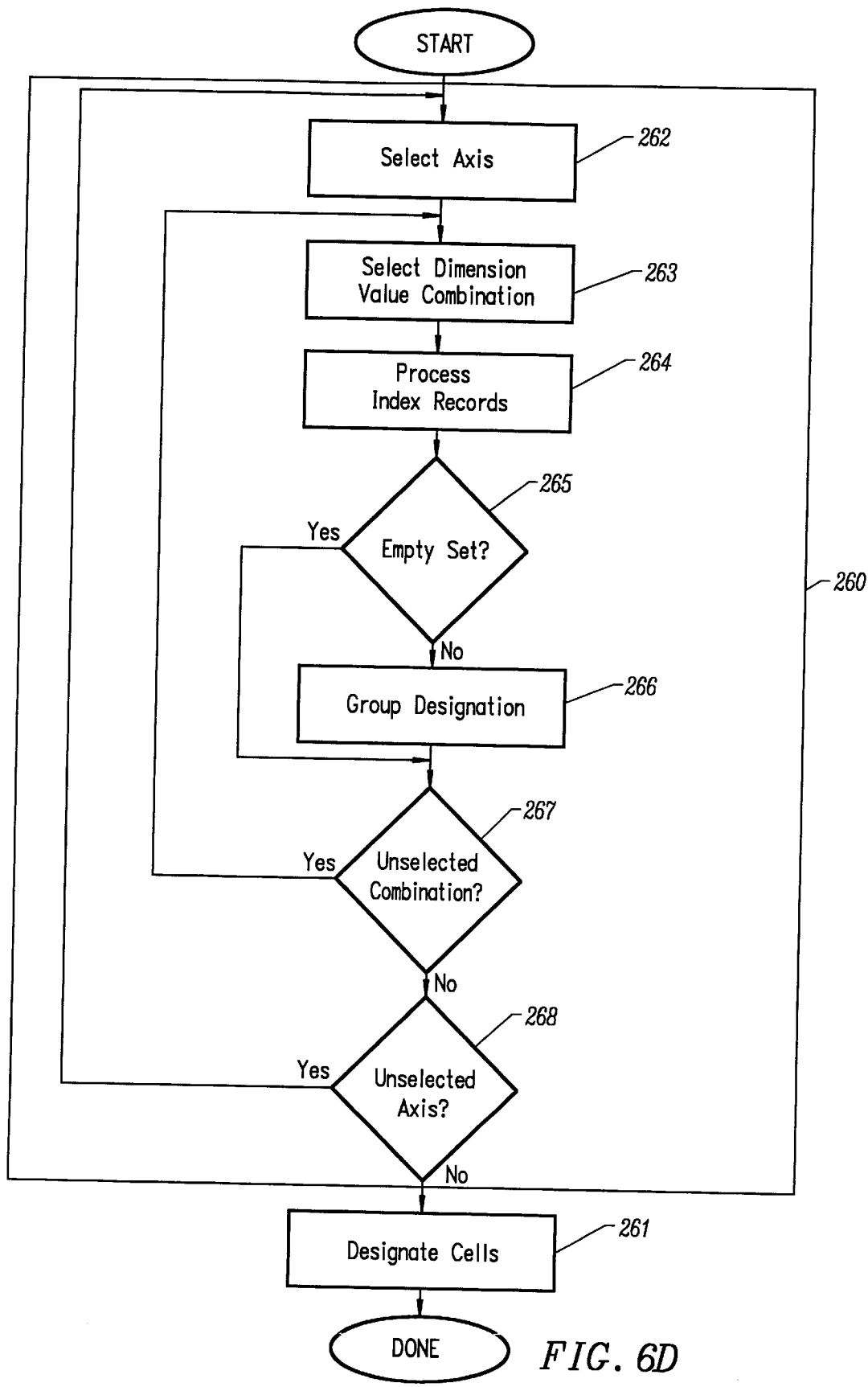
FIG. 6(d) illustrates a sequence of operations performed by the record management system shown in FIG. 5 in one embodiment of the present invention to generate a layout mapping.

FIG. 6(d) shows a more detailed view of a process that may be performed by the layout engine 212 in one embodiment of the present invention to identify the groups of record sets for each axis in step 260. First, the layout engine 212 selects an axis in step 262. Once an axis is selected, the layout engine 212 selects a combination of dimension values from the dimensions being represented on the axis. The combination consists of one dimension value from each of the dimensions on the axis. The layout engine 212, in step 264, processes the dimension index records for each of the dimension values in the combination.

As a result of the processing in step 264, the layout engine 212 identifies a set of records that are identified in each of the dimension index records being compared. In one embodiment of the present invention, the processing in step 264 includes taking an intersection of the record listings in each of the dimension index records being processed.

After the processing (step 264) is performed, the layout engine, in step 265, determines whether the set of records identified in the processing in step 264 is an empty set. If the set of records is not determined to be the empty sets then a group designation is performed in step 266 to determine which records should be designated into a group for the selected axis. Only records that contain a measure value associated with a measure to be displayed are designated to a group.

In the group designation (step 266), the query map record for each query that produced one of the records identified in the index record comparison (step 264) is examined. If the query map record indicates that the query called for a measure value that is associated with a measure to be displayed in the multi-dimensional view, then the records produced by that query are designated as being in the group. Otherwise, the records produced by that query are not included in the group. If no records are designated as being in the group, then no group is created. If at least one record has been designated into the group, then a group is created for the selected axis.

After finding an empty set in step 265 or performing group designation in step 266, the layout engine 212 determines, in step 267, whether any combination of dimension values for the selected axis has not yet been selected. If a combination has not yet been selected, the layout engine 212 returns to step 263 to select a new combination and repeat the above-described process illustrated in FIG. 6(d). Otherwise, the layout engine 212 determines whether any axis has not yet been selected in step 268. If any axis has not yet been selected, then the layout engine 212 returns to step 262 to select a new axis and repeat the above-described process illustrated in FIG. 6(d). If all of the axes have been selected, the layout engine 212 proceeds to designate cells for the layout mapping in step 261.

As described above, a multi-dimensional view may be required to have B dimensions on a vertical axis, D dimensions on a horizontal axis, and a measure being displayed in the view. In such a case, the layout engine 212 generates a set of groups of records for the horizontal axis and a set of groups of records for the vertical axis. For each of these axes, the layout engine 212 selects dimension value combinations, processes sets of dimension index records for each combination, and performs group designation operations as described above with reference to FIG. 6(d).

When the horizontal axis is selected, each dimension index record being processed identifies a dimension value that is associated with one of the D dimensions. Further, each of the D dimensions is identified in one of the dimension index records being processed. The processing identifies the records that are listed in all of the dimension index records being processed.

The records that are identified by the processing in step 264 undergo a group designation operation (step 266) to determine if a group is to be created for the horizontal axis using these records. The records that include a measure value that is associated with the measure to be displayed are designated as a group of records for the horizontal axis. If a processing reveals that no record sets are listed in all of the dimension index records being compared or that no record resulting from the processing includes a measure value associated with the measures to be displayed, then no group is established for the combination of dimension values being compared. All of the groups in the horizontal axis are identified by repeating the above identified processing of index records and group designation operation for each permutation of dimension values for the different D dimensions. A set of groups of records is also identified for the vertical axis of the view. The set of groups for the vertical axis is identified by using the same operations as are performed to obtain the set of groups for the horizontal axis, with the B dimensions replacing the D dimensions.

The layout engine 212 designates cells (step 261) to correspond to the set of groups on the horizontal axis and the set of groups on the vertical axis. The cells reside in the layout mapping storage unit 205. Each cell corresponds to a group on the vertical axis and a group on the horizontal axis. Accordingly, the measure represented in each cell is characterized by the B dimensions and D dimensions.

In the case of the record structure foundation that is formed by the query map 203 in FIG. 7(b) and the master table index 204 in FIG. 7(c), a layout mapping can be generated based on formatting information that is provided to the layout engine 212. For example, a user may specify a multi-dimensional view format having the region dimension represented on a vertical axis, the year and product dimensions represented on a horizontal axis, and Sales($) measure values used to determine measure results for cells that are characterized by the dimensions on the horizontal and vertical axes. The measure results may be determined by listing the retrieved measure values for a cell.

FIG. 8 shows a layout mapping 270 of cells $332_{1\text{-}10}$ for such a view. The layout mapping includes five sets of cells ($332_1$ & $332_6$, $332_2$ & $332_7$, $332_3$ & $332_8$, $332_4$ & $332_9$ and $332_5$ & $332_{10}$) extending across the horizontal axis with each cell set including two cells. On the horizontal axis 330, there are five groups of records (1H, 2H, 3H, 4H, and 5H) with each one corresponding to one of the sets of cells. Each of the groups on the horizontal axis 330 corresponds to a unique pair of dimension values for the year and product dimensions. On the vertical axis 331, there are two groups of records (1V and 2V) with each group corresponding to a different cell in each of the cell sets. One group on the vertical axis 331 includes records that identify the East Region, and the other group includes records that identify the West region.

The horizontal and vertical axis groups of records have been ascertained by employing the master table index 204 shown in FIG. 7(c) to perform the processing operation described above. The query map shown in FIG. 7(b) has been used to perform the group designation described above. The following Table A shows the combinations of dimension index records that are processed (step 264) to obtain the five groups designated (step 266) on the horizontal axis 330.

TABLE A

| INDEX RECORD PROCESSING | GROUP RECORDS | GROUP |
| --- | --- | --- |
| 1995 ∩ VCR | Q1: 1, 3 | 1H |
| 1995 ∩ TV | Q1: 2, 4 | 2H |
| 1995 ∩ Stereo | NONE | NONE |
| 1996 ∩ VCR | Q1: 5, 8 | 3H |
| 1996 ∩ TV | Q1: 6, 9 | 4H |
| 1996 ∩ Stereo | Q1: 7, 10 | 5H |

As shown in Table A, the groups of the horizontal axis 330 are obtained by identifying records in the master table 202 that include the following: 1) either a 1995 or 1996 year dimension value, 2) either a VCR, TV, or stereo product dimension value, and 3) a Sales($) measure value. For example, a processing (step 264) of the records identified in the 1995 dimension index record $320_1$ and VCR dimension index record $320_5$ shows that master table records Q1:1 and Q1:3 each contain a 1995 dimension value and a VCR dimension value. These records are then designated (step 266) as group 1H, because each record produced by Query 1, as shown in query map record 311 (FIG. 7B), contains a measure value associated with the Sales($) measure.

The same processing (step 264) is made for each combination of a year dimension value and a product dimension value. A group designation (step 266) operation is then performed on records identified in each processing to determine which records, if any, will be designated in a group Since no common records are listed in the 1995 dimension index record $320_1$ and stereo dimension index record $320_7$, no group is designated for the combination of the 1995 and stereo dimension values. Each processing in Table A is performed by making a comparison in which an intersection ("∩") is taken of the records listed in each of the dimension index records being processed.

The following Table B shows the dimension index records that are processed to obtain the two groups in the vertical axis 331 set of groups. Since each of these processings (step 264) is being made using only a single dimension index record, all of the records identified in the dimension index record undergo a group designation (step 266) to determine if they include a measure associated with the Sales($) measure. All of the records identified in the East index record $320_3$ are from Query 1, so they are designated as Group 1V. The records identified in the West index record $320_4$ are similarly all from Query 1, so they are designated as Group 2V.

TABLE B

| INDEX RECORD PROCESSING | GROUP RECORDS | GROUP |
|---|---|---|
| East | Q1: 1–2, 5–7 | 1V |
| West | Q1: 3–4, 8–10 | 2V |

In accordance with the present invention, cell sets are only designated to groups of records that are identified in Tables A and B. This reduces the designation of unused memory locations in the record management system 200, as compared to traditional record management systems. As described above, traditional record management systems form multi-dimensional record structures with cells designated to combinations of dimension values regardless of the coexistence of the dimension values and measure values in records.

For instance, a traditional record structure would have contained a set of cell memory locations for the sales of stereos in 1995 in both the East and West region. This designation of cells would be made regardless of the fact that the 1995 and stereo dimension values do not coexist in any record. In accordance with the present invention, no group is designated on the horizontal axis for the combination of the 1995 and stereo dimension values (see Table A). Accordingly, a layout mapping generated by record management system 200 will not wastefully designate cells for the 1995 sales of stereos in either the East or West.

Once the layout mapping is completed, the record management system 200 generates a multi-dimensional view in step 229 (FIG. 6(a)). The generation of the view may be performed by converting the layout mapping into a multi-dimensional view. This includes generating a display for each axis in the view, determining measure results, and placing the measure results into the layout mapping's cells. The layout engine 212 performs the operations that are necessary to convert the layout mapping into a display view, which also resides in the layout mapping storage unit 205.

Figure 6E:
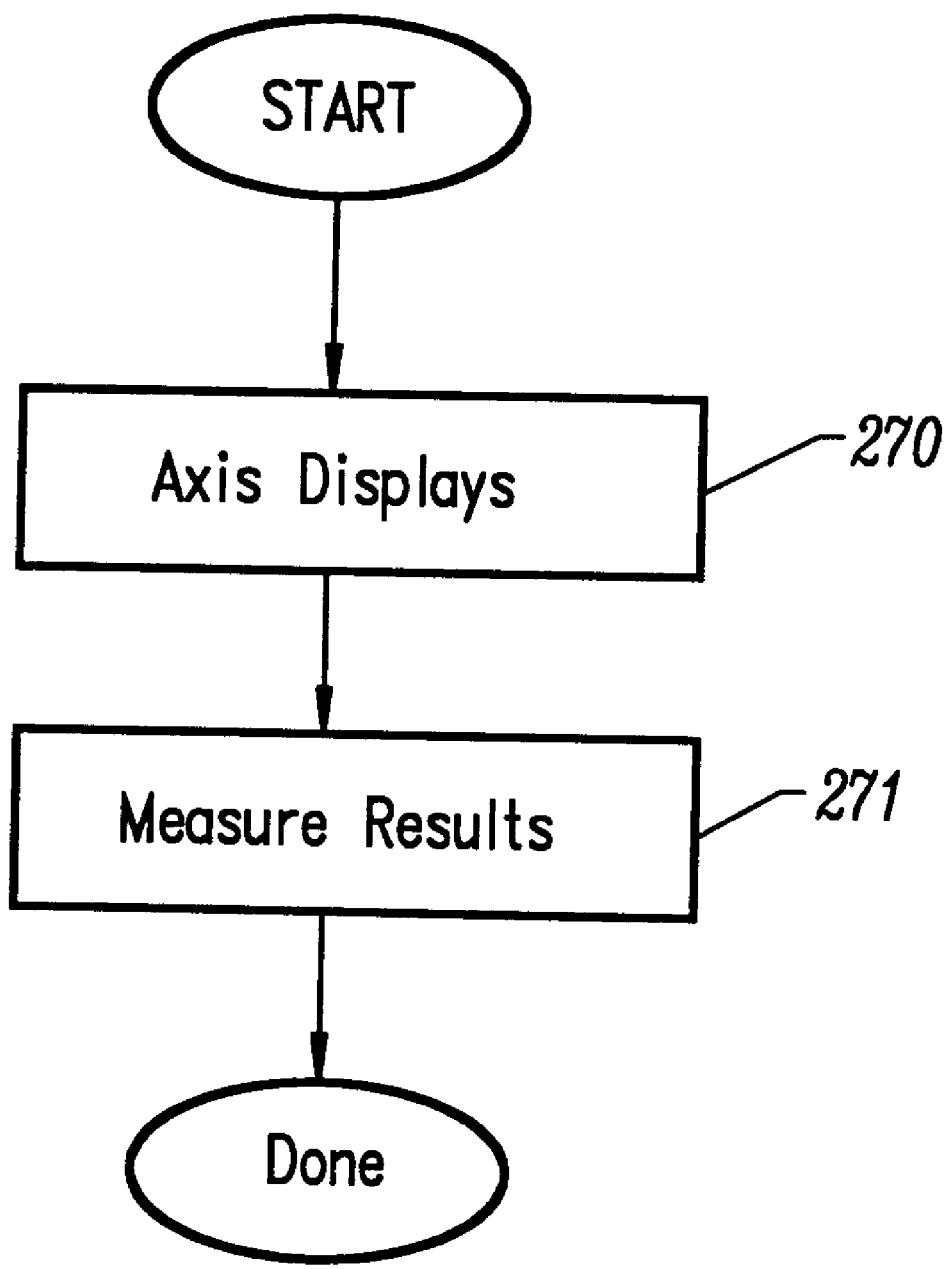
FIG. 6(e) illustrates a sequence of operations performed by the record management system shown in FIG. 5 to generate a multi-dimensional view using a record structure foundation and a layout mapping.

FIG. 6(e) illustrates a sequence of operations that may be performed by the layout engine 212 in accordance with the present invention to generate a multi-dimensional view in step 229. The layout engine 212 generates a display for each axis of the view in step 270. For each cell in the layout mapping, the layout engine 212 then determines a set of measure results and loads the measure results into the cell in step 271.

Figure 6F:
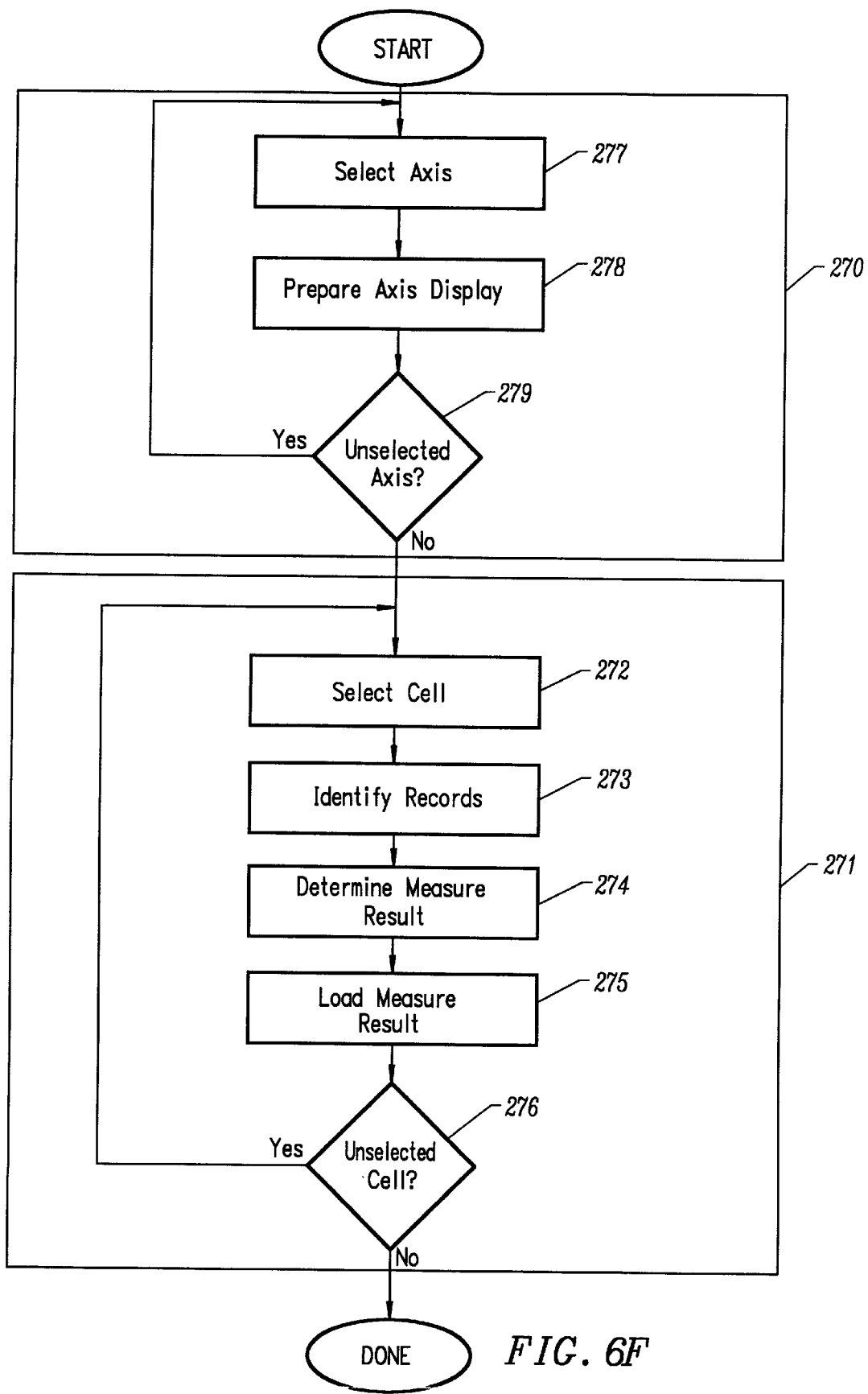
FIG. 6(f) illustrates a sequence of operations performed by the record management system shown in FIG. 5 in one embodiment the present invention to generate a multi-dimensional view using a record structure foundation and a layout mapping.

FIG. 6(f) shows a more detailed sequence of operation for the steps illustrated in FIG. 6(e) for one embodiment of the present invention. In order to generate the axis displays in step 271, the layout engine 212 selects one of the axes for the view in step 277. For the selected axis, a display is prepared in step 278.

In preparing the display, the axis is divided into a number of segments that is equal to the number of groups of records for the axis. Each segment is then labeled to correspond to one of the groups. A representation of the labeled segments is then stored in the layout mapping storage unit 212. Each segment on the axis will be aligned with a set of cells from the layout mapping when the view is displayed.

Once the axis display is prepared for the selected axis, the layout engine determines, in step 279, whether any axis for the view has not yet been selected and had a display prepared. If any one of the axes has not been selected, the layout engine returns to step 277 to select another axis and prepare a display as described above. If all of the axes have been selected, then the layout engine proceeds to determine and load measure results in step 271.

In determining and loading the measure results in step 271, the layout engine 212 selects a cell in the layout mapping in step 272. The layout engine then identifies records in the master table 202 that are to be used in determining a measure result for the cell in step 273.

The layout engine 212 identifies these records in step 273 by comparing the groups of records from each axis of the layout mapping that correspond to the selected cell. The layout engine's comparison identifies records that are in each axis group being compared and contain a measure value associated with the measure to be represented in the cell. This identification may be achieved by taking an intersection of the records listed in each group being compared. In some cases, the comparison may result in no records being identified, so that the identified set of records is the empty set.

In other cases, the identified records for determining a measure result may have been produced by different queries. When the identified records for a measure value span multiple queries, the layout engine 212 determines which query's records are to be used in obtaining a measure result for the cell. The selection between different queries will be described in greater detail below.

Once a set of records from a single query is identified for the measure in the selected cell (step 273), the layout engine 212 uses the identified records to determine a measure result for the cell in step 274. The measure result is determined according to the user specified operations for determining a measure result. As described above, these operations may call for measure values in each of the identified records to be listed, summed, averaged or processed in some other manner.

The layout engine 212 retrieves the measure values in the records from the master table 202 that are identified in step 273. The layout engine 212 then performs the specified operation to determine a measure result. Once the layout engine 212 determines a measure result for the measure being represented in the cell, it loads the measure result into the cell in step 275. If the set of records identified for a cell is the empty set, the corresponding measure result for the cell is assigned a value to reflect such an occurrence. For example, the symbol "N/A" may be provided to indicate that a measure result is "Not Available" in such an instance.

Once the measure result for a cell is loaded, in step 275, the layout engine 212 determines whether any cells in the layout mapping have not been selected to have a measure result determined in step 276. If any cell has not been selected, the layout engine returns to step 272 to select another cell and determine and load a measure result for the cell. If all of the cells have been selected, then the view generation is done.

Once the multi-dimensional view is generated in step 229 (FIG. 6(a)), the view is displayed on the display unit 206 in step 230. The display unit 206 is instructed to display the loaded cells from the layout mapping and the axis displays. The cells and axis displays are provided on the display unit 206 so that on each axis of the layout mapping's cells a corresponding axis display is shown with each segment in the axis display aligned with a corresponding set of cells. After the display (step 230) is completed, the record management system 200 determines whether another view is to be generated, in step 226.

As described above, the user may have specified that D dimensions be represented on a horizontal axis, B dimensions be represented on a vertical axis, and a measure be characterized by the B and D dimensions in a view. In such a case, X groups of record sets may have been identified for the D dimensions, and Y groups of record sets may have been identified for the B dimensions. Each cell in the layout mapping corresponds to a group in the set of X groups and a group in the set of Y groups.

The layout engine 212 identifies a set of records for each cell to determine a measure result (step 273). The set of records for a cell is identified (step 273) by identifying records that are in both a corresponding one of the groups on the horizontal axis and a corresponding one of the groups on the vertical axis and contain a measure value associated with the measure to be represented in the cell. If no records are identified, then an empty set value is assigned as the set of records for the cell. For each cell, the measure values in the identified set of records are used to determine a measure result (step 274) for the cell. The determined measure result is then loaded (step 275) into the cell.

For example, the layout engine 212 converts the multi-dimensional layout mapping shown in FIG. 8 into the multi-dimensional view shown in FIG. 9. The user desires to have the measure values corresponding to each cell $332_{1-10}$ listed in the cell. Only the Sales($) measure is to be displayed in each cell $332_{1-10}$, so a single set of records is identified for each cell $332_{1-10}$. For each cell $332_{1-10}$, the layout engine 212 identifies records (step 273) by taking an intersection of the records listed in the corresponding vertical axis group and the records listed in the corresponding horizontal axis group. Table C below shows the results of the layout engine's 212 identification of records (step 273) for each of the cells.

TABLE C

| CELL | GROUP COMPARISON | RECORDS |
|---|---|---|
| $332_1$ | 1H ∩ 1V | Q1: 1 |
| | Q1: 1, 3 ∩ Q1: 1–2, 5–7 | |
| $332_2$ | 2H ∩ 1V | Q1: 2 |
| | Q1: 2, 4 ∩ Q1: 1–2, 5–7 | |

TABLE C-continued

| CELL | GROUP COMPARISON | RECORDS |
|---|---|---|
| $332_3$ | 3H ∩ 1V | Q1: 5 |
| | Q1: 5, 8 ∩ Q1: 1–2, 5–7 | |
| $332_4$ | 4H ∩ 1V | Q1: 6 |
| | Q1: 6, 9 fl Q1: 1–2, 5–7 | |
| $332_5$ | 5H ∩ 1V | Q1: 7 |
| | Q1: 7, 10 ∩ Q1: 1–2, 5–7 | |
| $332_6$ | 1H ∩ 2V | Q1: 3 |
| | Q1: 1, 3 ∩ Q1: 3–4, 8–10 | |
| $332_7$ | 2H ∩ 2V | Q1: 4 |
| | Q1: 2, 4 ∩ Q1: 3–4, 8–10 | |
| $332_8$ | 3H ∩ 2V | Q1: 8 |
| | Q1: 5, 8 ∩ Q1: 3–4, 8–10 | |
| $332_9$ | 4H ∩ 2V | Q1: 9 |
| | Q1: 6, 9 ∩ Q1: 3–4, 8–10 | |
| $332_{10}$ | 5H ∩ 2V | Q1: 10 |
| | Q1: 7, 10 ∩ Q1: 3–4, 8–10 | |

For each cell $332_{1-10}$, the measure value in the identified record for the cell is retrieved from the master table 202 and listed in the cell. For example, in formulating a measure result (step 274) for the first cell $332_1$, the layout engine 212 identifies (step 273) the set of records listed in both the 1995, VCR group (1H) and the East group (1V). This identification is achieved by taking an intersection of the records in group 1H (Q1: 1,3) and the records in group 1V (Q1: 1–2,5–7). The identified set of records includes only record1 from Query 1 (Q1: 1). In order to determine the measure result (step 274) for cell $332_1$, the layout engine 212 retrieves the measure value in record 1 of Query 1 (Q1: 1) from the master table 202. The retrieved measure value of $50,000, which also serves as the listed measure result in this example, is then loaded (step 275) into cell$332_1$.

In addition to loading measure results into each of the cells $332_{1-10}$ shown in FIGS. 8 and 9, a horizontal axis 333 display and vertical axis 334 display are prepared. The horizontal axis 333 display includes segments for each of the following groups: 1) 1995, VCR (1H); 2) 1995, TV (2H); 3) 1996, VCR (3H); 4) 1996, TV (4H); and 5) 1996, Stereo (5H). The vertical axis 334 display includes segments for each of the following groups: 1) East (1V); and 2) West (2v).

In displaying (step 230) the view shown in FIG. 9, each horizontal axis segment is aligned to a corresponding set of cells, and each vertical axis segment is aligned to a corresponding set of cells. On the horizontal axis 333, the display unit 206 bifurcated the horizontal axis display into two levels with each level corresponding to a different dimension on the horizontal axis. However, the horizontal axis 333 display still only contains one segment for each of the groups of record sets on the horizontal axis 333.

C. Multiple Queries

As described above, the master table 202 and record structure foundation may be augmented with additional records based on responses to additional queries. As shown in steps 220–226 in FIG. 6(a), the record management system 200 may submit multiple queries to a database management system 213 and update the master table 202, query map 203, and master table index 204 accordingly by repeating steps 220–226.

One instance in which it may be desirable to perform such an augmentation is when a user of the record management system 200 wishes to expand a view that is presently being displayed. Additional information that is needed for the expansion may not be in the master table 202. As a result, a new query is performed to obtain the necessary data for expanding the view. This is easily handled in embodiments of the present invention, which update the master table 202 and record structure foundation based on the new query, so that a new view may be generated.

In a traditional record management system 200, data from a new query cannot be employed in a view, unless it is first incorporated into a multi-dimensional record structure. However, as discussed above, an existing multi-dimensional structure cannot be augmented. Therefore, an entirely new multi-dimensional record structure will have to be constructed based on a new query. The new query has to gather the information from the original query, as well as the new information for expanding the view. This takes a considerable amount of time and resources, thereby limiting the traditional system's flexibility and feasibility for expanding views.

An example shown in FIGS. 10(a)–12 illustrates how a view can be expanded in accordance with the present invention. An expanded multi-dimensional view of a portion of the view shown in FIG. 9 is desired. The expanded view is to include dollar sales measures for products in the East region broken down by sales offices in the East region. The dollar sales measures for the West region are to be shown as in FIG. 9. FIG. 12 shows how the final display is to appear. A new view is created for sales in the East region by sales office and then substituted into the display in FIG. 9 for the portion of the display that represents sales in the East region.

However, none of the records in the master table 202 include dimension values that are associated with a sales office dimension. After the view shown in FIG. 9 is displayed (step 230, FIG. 6(a)), the record management system 200 determines (step 226) that no additional views are desired without performing an additional query. The record management system 200 then determines that a new query is to be performed (step 220). After determining that a new query is to be performed, the record management system 200 retrieves requirements for the new query (step 221). In the present case, the record management system 200 is instructed that the new query is to call for records including a year dimension value, the East region dimension value, a sales office dimension value, a product dimension value, and a dollar sales measure value.

The new query, which is referred to as Query 2 ("Q2"), is submitted to the database management system 213 (step 222). The records returned by the database management system 213 are received by the record management system 200 and maintained in the master table 202 (step 223). The state of the master table 202 after the record management system 200 receives the records from the new query is shown in FIG. 10(a). The master table 202 now maintains the records from Query 1 (Q1: 1–10) $301_{1-10}$ as well as the records from Query 2 (Q2: 1–13) $302_{1-13}$.

The record management system 200 also updates the query map 203 (step 224) and updates the master table index 204 (step 225), to account for the records produced by Query 2. As shown in FIG. 10(b), the query map 203 now contains both the record 311 for Query 1 and a new record 312 for Query 2. The new query map record 312 identifies Query 2 and the dimensions, dimension value restrictions, and measures that appear in Query 2. Accordingly, the year dimension, East region dimension value, sales office dimension, product dimension, and dollar sales measure are listed.

In the master table index 204, each existing dimension index record $320_{1-7}$ that corresponds to a dimension value in Query 2 is updated, as described above with reference to FIGS. 6(a) and 6(b). As a result, index records $320_{1-7}$ are each updated to identify the Query 2 master table 202 records that include the dimension value identified in the index record. A new dimension index record is generated, as described above with reference to FIGS. 6(a) and 6(b), for each dimension value in Query 2 that has no existing corresponding dimension index record.

As seen in FIG. 10(c), the updated master table index 204 includes new dimension index records for the following sales office dimension values: 1) New York $320_8$; 2) Boston $320_9$; and 3) Philadelphia $320_{10}$. FIG. 10(c) also shows that each dimension index record $320_{1-10}$ identifies all master table 202 records from both Query 1 and Query 2 that include a corresponding dimension value. Additionally, each dimension index record $320_{1-10}$ identifies a dimension that is associated with a dimension value in the index record.

Once the record structure foundation is updated by updating the query map 203 (step 224) and master table index 204 (step 225), the record management system 200 determines that a new multi-dimensional view is to be generated (step 226). Next, the format for the new multi-dimensional view is retrieved (step 227). The view is to include a horizontal axis and a vertical axis. The horizontal axis is to include the year and product dimensions, and the vertical axis is to include the sales office dimensions and the East region dimension value. The dollar sales measure is to be characterized in the cells by the dimensions on the horizontal and vertical axes, and the measure results are to be determined by merely listing the measure values corresponding to each cell.

The new view will be substituted into the view shown in FIG. 9 to replace the portion of the FIG. 9 view that represents dollar sales in the East region. The augmented FIG. 9 view will then be displayed as shown in FIG. 12. A user of the record management system 200 may also select to have both the view in FIG. 9 and the view in FIG. 12 simultaneously displayed by the system 200.

Once the formatting information is gathered, a layout mapping is generated (step 228) for the new expanded view. FIG. 11 illustrates the layout mapping that is generated. Groups of records (1H–5H) are identified for the horizontal axis 340 by identifying each record in the master table 202 that includes a unique pair of dimension values from each of the horizontal axis, dimensions and a measure value associated with the Sales($) measure. As described above, a first step of this group identification (step 260) may be performed by processing dimension index records (step 264). The second step of group designation (step 266) may then be performed by referring to the updated query map 203 shown in FIG. 10(b). Table D below illustrates the identification of groups 1H–5H.

TABLE D

| INDEX RECORD PROCESSING | GROUP RECORDS | GROUP |
| --- | --- | --- |
| 1995 ∩ VCR | Q1: 1, 3<br>Q2: 1, 2 | 1H |
| 1995 ∩ TV | Q1: 2, 4<br>Q2: 3, 4 | 2H |
| 1995 ∩ Stereo | NONE | None |
| 1996 ∩ VCR | Q1: 5, 8<br>Q2: 5–7 | 3H |
| 1996 ∩ TV | Q1: 6, 9<br>Q2: 8–10 | 4H |
| 1996 ∩ Stereo | Q1: 7, 10<br>Q2: 11–13 | 5H |

As shown in Table D, an intersection is taken of the records listed in a year dimension index record in FIG. 10(c) and the records listed in a product dimension index record in FIG. 10(c). For each record in the resulting intersection, the query that produced the record is evaluated to determine if the record contains a Sales($) measure value. By referring to query map records 311 and 312 (FIG. 10(b)) it is seen that each record that was produced by either Query 1 or Query 2 contains a Sales($) measure value. The intersection and query evaluation are performed for each combination of a year dimension value and a product dimension value. For example, group 1H is identified to include records 1 and 3 from Query 1 (Q1: 1, 3) and records 1 and 2 from Query 2 (Q2: 1,2). Each of these records is listed in both the dimension index record for 1995 $320_1$ (FIG. 10(c)) and the dimension index record for VCR $320_5$ (FIG. 10(c)), and includes a measure value associated with the Sales($) measure.

Groups of records are also identified (step 260) for the vertical axis 341 by identifying records in the master table 202 that include the following: 1) a dimension value for the sales office dimension; 2) an East dimensional value; and 3) a measure value associated with the dollar sales measure. The identification is once again performed by processing index records and examining query map records. Table E below illustrates this identification of groups (1V–3V) for the vertical axis 341.

TABLE E

| INDEX RECORD PROCESSING | GROUP RECORDS | GROUP |
| --- | --- | --- |
| New York ∩ East | Q2: 1, 3, 5, 8, 11 | 1V |
| Boston ∩ East | Q2: 2, 4, 6, 9, 12 | 2V |
| Philadelphia ∩ East | Q2: 7, 10, 13 | 3V |

Once the groups of records are established for each axis 340, 341, cells $342_{1-15}$ are designated for the layout mapping (FIG. 11) in the layout mapping storage unit 205. A set of cells is designated for each of the five groups on the horizontal axis 340. Each cell set includes three cells, with each cell corresponding to a different one of the three groups on the vertical axis.

Once the layout mapping is complete, the record management system 200 generates a multi-dimension view (step 229) from the layout mapping. The generated multi-dimensional view is shown in FIG. 12. First, a display is generated for each of the view's axes. The horizontal axis 343 display is generated to be the same as the horizontal axis display in FIG. 9. The vertical axis 344 display includes four segments. One segment is for the West region dollar sales as shown in FIG. 9. The remaining three segments are used to replace the East region segment in FIG. 9. Each one of the three new segments represents a different sales office. A regional dimension label is also added to the three new segments to show that the sales offices are all in the East.

When the view in FIG. 12 is displayed (step 230), the group segments on each axis are aligned with a corresponding set of cells, and each cell includes a measure value that is characterized by the dimension values in each of its corresponding axis groups. The cells $342_{1-15}$ in the new layout mapping (FIG. 11) are aligned with the three new segments (New York, Boston, and Philadelphia) so that each one of cells $342_{1-15}$ corresponds to one of the three new segments. The cells from FIG. 9 that correspond to the West segment are also employed in the view in FIG. 12 to correspond to the West segment and provide the same measure results as in FIG. 9.

Once the axis displays are generated, measure results are determined for each cell $342_{1-15}$ in the new layout mapping (FIG. 11) and loaded into the cell. Records to be used in determining the measure results are identified (step 273, FIG. 6(f)) for each cell. For each cell $342_{1-15}$ this set of records is identified by taking an intersection of the records identified in each axis group that corresponds to the cell. Table F shows the intersection comparison that is performed for each cell $342_{1-15}$ in the layout mapping in FIG. 11.

TABLE F

| CELL | GROUP COMPARISON | RECORDS |
| --- | --- | --- |
| $342_1$ | 1H ∩ 1V | Q2: 1 |
| $342_2$ | 2H ∩ 1V | Q2: 3 |
| $342_3$ | 3H ∩ 1V | Q2: 5 |
| $342_4$ | 4H ∩ 1V | Q2: 8 |
| $342_5$ | 5H ∩ 1V | Q2: 11 |
| $342_6$ | 1H ∩ 2V | Q2: 2 |
| $342_7$ | 2H ∩ 2V | Q2: 4 |
| $342_8$ | 3H ∩ 2V | Q2: 6 |
| $342_9$ | 4H ∩ 2V | Q2: 9 |
| $342_{10}$ | 5H ∩ 2V | Q2: 12 |
| $342_{10}$ | 1H ∩ 3V | Empty Set (N/A) |
| $342_{12}$ | 2H ∩ 3V | Empty Set (N/A) |
| $342_{13}$ | 3H ∩ 3V | Q2: 7 |
| $342_{14}$ | 4H ∩ 3V | Q2: 10 |
| $342_{15}$ | 5H ∩ 3V | Q2: 13 |

For each of cells $342_{11}$ and $342_{12}$, no record set is identified in both the horizontal group (1H and 2H, respectively) and vertical group (3V) corresponding to the cell. Accordingly, the measure results for these cells $342_{11}$, $342_{12}$ will be assigned a value to indicate that no measure result is available, such as "N/A."

For each of the other cells $342_{1-10}$, $342_{13-15}$, a measure result is determined (step 274) by retrieving the Sales($) measure value from each record that is identified in Table F for the cell. The retrieved measure value is then loaded (step 275) into the corresponding cell as the measure result. For example, the measure value in the first record from Query 2 (Q2: 1) is retrieved from the master table 202 and loaded into cell $342_1$ in the layout mapping. For the cells in the view in FIG. 12 that correspond to the West segment of the vertical axis no new measure results need to be created. The corresponding measure results from FIG. 9 may be employed.

D. Selecting Between Queries

As stated above, records from multiple queries may be identified for use in determining a measure result for a cell. When such a case arises, the record management system 200 determines which query's records are best suited to be used in determining the measure result. The following example will assist in illustrating how the record management system 200 selects the most appropriate query to be used.

The master table 202, query map 203, and master table index 204 are all in the same state as described above in FIGS. 10(a), 10(b), and 10(c), respectively. The record management system has determined that a new view is to be generated (step 226, FIG. 6(a)). The record management system 200 has gathered formatting information about the view (step 227) indicating that it is to have a horizontal axis and a vertical axis. The horizontal axis is to include the 1995 year dimension value and the product dimension. The vertical axis is to include the region dimension. The dollar sales measure is to be represented in the cells by the listing of measure values.

Accordingly, the record management system 200 prepares a layout mapping (step 228) by identifying groups of records for the horizontal axis and vertical axis and designating cell sets. FIG. 13 illustrates the layout mapping that is generated. Table G shows the groups of records (1H and 2H) that are identified for the horizontal axis 350 by performing index record processing (step 264) and group designation (step 266) as described above with reference to FIGS. 6(a) and 6(d).

TABLE G

| INDEX RECORD PROCESSING | GROUP RECORDS | GROUP |
| --- | --- | --- |
| 1995 ∩ VCR | Q1: 1, 3 | 1H |
|  | Q2: 1, 2 |  |
| 1995 ∩ TV | Q1: 2, 4 | 2H |
|  | Q2: 3, 4 |  |
| 1995 ∩ Stereo | NONE | None |

Table H shows the groups of records (1V and 2V) for the vertical axis 351 that are identified by employing the index record processing (step 264) and group designation (step 266).

TABLE H

| INDEX RECORD PROCESSING | GROUP RECORDS | GROUP |
| --- | --- | --- |
| East | Q1: 1–2, 5–7 | 1V |
|  | Q2: 1–13 |  |
| West | Q1: 3–4, 8–10 | 2V |

A set of cells is designated for each of the groups on the horizontal axis (1H and 2H). Each of the designated cell sets ($352_1$ & $352_3$ and $352_2$ & $352_4$) has two cells, with each cell corresponding to a different one of the two groups on the vertical axis (1V and 2V).

Next, a multi-dimensional view is generated (step 229). The resulting view is illustrated in FIG. 14. In order to determine measure results for each cell $352_{1-4}$, records are identified (step 273) that contain measure values for use in the determination (step 274). For each cell $352_{1-4}$ a corresponding horizontal axis group and corresponding vertical axis group of records are compared to identify records that contain a Sales($) measure value and are listed in both the horizontal axis group and the vertical axis group. Table I below shows the comparison that is performed. The comparison shown in Table I is performed for each cell $352_{1-4}$ by taking an intersection of the groups of records that correspond to the cell.

TABLE I

| CELL | GROUP COMPARISON | RECORDS |
| --- | --- | --- |
| $352_1$ | 1H ∩ 1V | Q1: 1 |
|  |  | Q2: 1, 2 |
| $352_2$ | 2H ∩ 1V | Q1: 2 |
|  |  | Q2: 3, 4 |
| $352_3$ | 1H ∩ 2V | Q1: 3 |
| $352_4$ | 2H ∩ 2V | Q1: 4 |

For both cells $352_1$ and $352_2$, records from multiple queries have been identified. When this occurs, the record management system 200 determines which query's set of records should be employed for each cell.

As described above, this determination is included as part of identifying the correct records (step 273, FIG. 6(*f*)) to employ for determining a measure result for a cell. For each cell, the identification of records (step 273) is made by comparing the records in the query map 203. The query map's records are compared to determine which query calls for the measure being represented and only a set of dimensions that match the dimensions being employed in the view. The records that are generated by such a query are employed in determining the measure results (step 274) for the cells. If no such query exists, then the measure results are designated to be not available ("N/A").

In the present case, the dimensions being employed in the view are the year dimension, product dimension, and region dimension, and the measure being employed is the dollar sales measure. Query 1 has the same dimensions and measure that are being employed in the view, while Query 2 has the dimensions and measure being employed as well as the additional sales office dimension. Accordingly, Query 1 records are identified (step 273) to be used for both cells $351_1$ and $352_2$. As a result, a Revised Table I may be established to show the identified records for each cell $352_{1-4}$.

REVISED TABLE I

| CELL | GROUP COMPARISON | RECORDS |
| --- | --- | --- |
| $352_1$ | 1H ∩ 1V | Q1: 1 |
| $352_2$ | 2H ∩ 1V | Q1: 2 |
| $352_3$ | 1H ∩ 2V | Q1: 3 |
| $352_4$ | 2H ∩ 2V | Q1: 4 |

For each cell $352_{1-4}$ in the view, the record management system 200 uses the records identified in the Revised Table I from Query 1 to retrieve measure values from the master table 202. Each measure value is then listed in a corresponding cell, and axis displays 353, 354 are generated. Once the view is created, it is displayed (step 230) as shown in FIG. 14.

E. Multiple Measures

In accordance with the present invention, multiple measures may be represented in a set of cells that each correspond to the same set of axis record groups. In one example of such a view, a measure of dollar sales is displayed in a first cell; a unit sales measure is displayed in a second cell, and both the first cell and second cell correspond to the same axis record groups. Such a view may be generated by further augmenting the record structure foundation shown in FIGS. 10(*b*) and 10(*c*) with record sets retrieved from a new query.

In order to further augment the query map 203 and master table index 204 shown in FIGS. 10(*b*) and 10(*c*), respectively, the record management system 200 recognizes that a new query is to be performed (step 220, FIG. 6(*a*)) and retrieves information about the requirements for the query (step 221). This new query is referred to as Query 3. Query 3 requests records that include values for a region dimension, year dimension, fiscal period dimension, dollar sales measure and unit sales measure. The dollar sales measure is being repeated, because a new hierarchically related dimension of fiscal period is being included to provide a more granular view of sales within a year. As a result, a periodic set of dollar sales measure values is obtained.

Once the Query 3 information in gathered, the record management system 200 submits Query 3 to the database management system 213 (step 222). The records returned by the database management system 213 are maintained in the master table 202 (step 223). The query map 203 is updated (step 224), and the master table index 204 is updated (step 225) to account for the newly received records. FIGS. 15(*a*), 15(*b*), and 15(*c*) illustrate the state of the master table 202, query map 203, and master table index 204, respectively, after they are updated. The query map 203, master table index 204, and master table 202 are updated in accordance with the present invention as described above with reference to FIGS. 6(*a*)–6(*b*), FIGS. 7(*a*)–7(*c*) and 10(*a*)–10(*c*) to account for the newly received records.

As shown in FIG. 15(*a*) (Part 1 and Part 2), the master table 202 now includes 16 records from Query 3 $303_{1-16}$ (Q3: 1–16), along with the records from Query 1 $301_{1-10}$ (Q1: 1–10) and Query 2 $302_{1-13}$ (Q2: 1–13). The updated query map 203 shown in FIG. 15(b) includes a new record 313 identifying Query 3 and the following dimensions and measures that appear in Query 3: 1) region dimension; 2) year dimension; 3) fiscal period dimension ("Fiscal Period"); 4) dollar sales measure; and 5) unit sales measure ("Sales(U)").

The updated master table index 204 shown in FIG. 15(c) includes the dimension index records $320_{1-10}$ shown in FIG. 10(c) along with new dimension index records $320_{11-14}$ for the fiscal period dimension records. Dimension index records $320_{11-14}$ are generated for the following fiscal period dimension values: 1) first period ("P1"); 2) second period ("P2"); 3) third period ("P3"); and 4) fourth period ("P4"). Each dimension index record $320_{1-14}$ identifies the dimension associated with an identified dimension value and the records in the master table 202 that include the identified dimension value.

Once the record structure foundation and master table 202 are updated and the record management system 200 determines that a new view is to be generated (step 226), the format for the view is retrieved (step 227). In the present case, the view is to include a horizontal axis and a vertical axis. The year and fiscal period dimensions are represented on the horizontal axis, and the region dimension is represented on the vertical axis. The dollar sales measure and the unit sales measure are represented in the cells.

A layout mapping is then generated (step 228), as shown in FIG. 16. Groups of record sets (1H–8H) are identified for the horizontal axis 360 in accordance with the present invention as described above. Table J shows the processing (step 264) and designations (step 266) that are made in identifying each group of records (1H–8H).

TABLE J

| INDEX RECORD PROCESSING | GROUP RECORDS | GROUP |
| --- | --- | --- |
| 1995 ∩ P1 | Q3: 1, 5 | 1H |
| 1995 ∩ P2 | Q3: 2, 6 | 2H |
| 1995 ∩ P3 | Q3: 3, 7 | 3H |
| 1995 ∩ P4 | Q3: 4, 8 | 4H |
| 1996 ∩ P1 | Q3: 9, 13 | 5H |
| 1996 ∩ P2 | Q3: 10, 14 | 6H |
| 1996 ∩ P3 | Q3: 11, 15 | 7H |
| 1996 ∩ P4 | Q3: 12, 16 | 8H |

As shown in Table J, eight groups of records are identified. Each group is obtained by first processing (step 264, FIG. 6(d)) the records identified in a pair of dimension index records. Each pair of dimension index records being processed consists of a unique pair of a year dimension index record and a fiscal period dimension index record. The processing is performed by taking an intersection of the records listed in each index record being compared.

The set of records resulting from the intersection then undergo a group designation operation, provided that the resulting set of records from the intersection is not the empty set. The group designation operation employed in the present case differs from the group designation operation described with reference to step 266 in FIG. 6(d). In step 266 in FIG. 6(d) only a single measure was considered. When multiple measures are to be displayed, the group designation step is altered to identify the records resulting from the index record comparison (step 264) that include measure values associated with either the dollar sales measure or unit sales measure. For each record, this operation may be performed by referencing the record in the query map 203 for the query that produced the record. If the query map record indicates that the query called for either dollar sales measures or unit sales measures, then the record may be designated as a group record in a group on the horizontal axis. Otherwise, the record is not included in a group. For each set of records identified by an intersection, at least one record must be designated as a group record for an axis group to be created.

Records in each group are those which are identified in each of the dimension index records being processed and include either a Sales($) measure value or Sales(U) measure value. For example, group 1H is identified from taking the intersection of the records listed in each of the 1995 and P1 dimension index records, and then determining which of the resulting intersection records includes either a Sales($) measure value or a Sales(U) measure value. As a result of these operations, records Q3: 1 and Q3: 5 are identified as the group records that are in horizontal axis group 1H.

Groups of records (1V and 2V) are also identified for the vertical axis 361 in accordance with the present invention as described above for the horizontal axis 360. Table K shows the processing that is performed and the group records and groups (1V and 2V) that are designated.

TABLE K

| INDEX RECORD PROCESSING | GROUP RECORDS | GROUP |
| --- | --- | --- |
| East | Q1: 1–2, 5–7 | 1V |
|  | Q2: 1–13 |  |
|  | Q3: 1–4, 9–12 |  |
| West | Q1: 3–4, 8–10 | 2V |
|  | Q3: 5–8, 13–16 |  |

As shown in Table K, two groups of records (1V and 2V) are identified. Each group is identified by processing (step 264) the records identified in a region dimension index record $320_{3-4}$. Since only a single index record is being processed, no intersection needs to be taken. For each dimension index record $320_3$ and $320_4$, the records listed in FIG. 15(c) undergo a group designation operation as described above with reference to the horizontal axis 360. As a result, for the East dimension and West dimension, records from the master table 202 are designated as group records, thereby creating groups 1V and 2V respectively. Record sets in a group (1V and 2V) are those which are identified in the region dimension index record for the corresponding dimension value and include either a Sales($) measure value or a Sales(U) measure value. For example, group 1V includes records that include an East dimension value and either a Sales($) measure value or a Sales(U) measure value.

Once the groups are identified for each axis 360, 361, cell sets $362_{1-16}$ are designated for the layout mapping as shown in FIG. 16. Each of the sets $362_{1-16}$ includes a cell for one of the measures being represented in the view. Accordingly, a cell is included for the Sales($) measure and a cell is included for the Sales(U) measure. As shown in FIG. 16, the cell sets are comprised of eight sets of cell sets ($362_1$ & $362_9$, $362_2$ & $362_{10}$, $362_3$ & $362_{11}$, $362_4$ & $362_{12}$, $362_5$ & $362_{13}$, $362_6$ & $362_{14}$, $362_7$ & $362_{15}$ and $362_8$ & $362_{16}$). Each set of cell sets corresponding to a different group on the horizontal axis 360. Each set of cell sets includes two cell sets, with each of the two cell sets corresponding to a different one of the groups (1V and 2V) on the vertical axis 361.

After the layout mapping is generated in the layout mapping storage unit 205, the record management system 200 generates a view (step 229) from the layout mapping (FIG. 16). The view is displayed as shown in FIG. 17. The horizontal axis 363 display and vertical axis 364 display are generated in the same manner as described above, with one addition An extra level of identifiers is added to the vertical axis 364 display to identify which cell in each of the cell sets $362_{1-16}$ corresponds to the Sales($) measure and which cell corresponds to the Sales(U) measure. Accordingly, the vertical axis 364 is divided into two segments, with one being for the East (group 1V) and one being for the West (group 2V). Each segment is then divided into two portions, with one being for the Sales($) measure and one being for the Sales(U) measure. The horizontal axis 362 is divided into eight segments, with each segment corresponding to one of groups 1H–8H.

For each cell set $362_{1-16}$, a set of records is identified for each measure. The records identified for each measure are employed to determine the measure results that are to be loaded into each cell in the cell sets $362_{1-16}$. Table L shows the operation that is performed to identify records for each measure in each cell.

TABLE L

| CELL | GROUP COMPARISON | RECORDS |
|---|---|---|
| $362_1$ | 1H ∩ 1V [Sales($)] | Q3: 1 |
|  | 1H ∩ 1V [Sales(U)] | Q3: 1 |
| $362_2$ | 2H ∩ 1V [Sales($)] | Q3: 2 |
|  | 2H ∩ 1V [Sales(U)] | Q3: 2 |
| $362_3$ | 3H ∩ 1V [Sales($)] | Q3: 3 |
|  | 3H ∩ 1V [Sales(U)] | Q3: 3 |
| $362_4$ | 4H ∩ 1V [Sales($)] | Q3: 4 |
|  | 4H ∩ 1V [Sales(U)] | Q3: 4 |
| $362_5$ | 5H ∩ 1V [Sales($)] | Q3: 9 |
|  | 5H ∩ 1V [Sales(U)] | Q3: 9 |
| $362_6$ | 6H ∩ 1V [Sales($)] | Q3: 10 |
|  | 6H ∩ 1V [Sales(U)] | Q3: 10 |
| $362_7$ | 7H ∩ 1V [Sales($)] | Q3: 11 |
|  | 7H ∩ 1V [Sales(U)] | Q3: 11 |
| $362_8$ | 8H ∩ 1V [Sales($)] | Q3: 12 |
|  | 8H ∩ 1V [Sales(U)] | Q3: 12 |
| $362_9$ | 1H ∩ 2V [Sales($)] | Q3: 5 |
|  | 1H ∩ 2V [Sales(U)] | Q3: 5 |
| $362_{10}$ | 2H ∩ 2V [Sales($)] | Q3: 6 |
|  | 2H ∩ 2V [Sales(U)] | Q3: 6 |
| $362_{11}$ | 3H ∩ 2V [Sales($)] | Q3: 7 |
|  | 3H ∩ 2V [Sales(U)] | Q3: 7 |
| $362_{12}$ | 4H ∩ 2V [Sales($)] | Q3: 8 |
|  | 4H ∩ 2V [Sales(U)] | Q3: 8 |
| $362_{13}$ | 5H ∩ 2V [Sales($)] | Q3: 13 |
|  | 5H ∩ 2V [Sales(U)] | Q3: 13 |
| $362_{14}$ | 6H ∩ 2V [Sales($)] | Q3: 14 |
|  | 6H ∩ 2V [Sales(U)] | Q3: 14 |
| $362_{15}$ | 7H ∩ 2V [Sales($)] | Q3: 15 |
|  | 7H ∩ 2V [Sales(U)] | Q3: 15 |
| $362_{16}$ | 8H ∩ 2V [Sales($)] | Q3: 16 |
|  | 8H ∩ 2V [Sales(U)] | Q3: 16 |

As shown in Table L, two separate identifications of records are performed for each cell $362_{1-16}$. This differs from the record identification step 273 that is described above with reference to FIG. 6(f), since multiple measures are to be represented in a single view. In Table L, each record identification for a cell set $362_{1-16}$ corresponds to one of the measures (Sales ($), Sales (U)) that is to be represented in the cell set $362_{1-16}$. For a measure to be displayed in a cell, records that appear in each group corresponding to the cell's cell set and include a measure value associated with the measure are identified. The identification of records for each measure in each cell may be performed by first taking an intersection of the records identified in a corresponding horizontal group (1H–8H) and a corresponding vertical group (1V and 2V). Then a determination is made of whether the resulting records include a measure value associated with the measure to be represented in the cell. This determination may be made for each record by accessing a query map record for the query that produced the record and determining whether the query called for the measure. If the query did call for the measure to be represented in the cell, then the record can be used for determining the cell's measure result. Otherwise, he record cannot be employed.

For the dollar sales measure in the first cell $362_1$, the intersection is taken of the records identified in the 1995, P1 group (1H) and the East group (1V). The resulting record is Q3: 1 The query map record 313 for Query 3 indicates that Query 3 called for the Sales($) measure. Accordingly, Q3: 1 may be employed to determine a measure result for the cell in cell set $362_1$ that corresponds to the Sales ($) measure. As shown in Table L, the Sales(U) measure cell in the first cell set $362_1$ also has record Q3: 1 identified for determining a measure result.

For each cell in cell sets $362_{1-16}$, the identified records for each measure are retrieved from the master table 202 and used to determine a measure result (step 274) for each cell. In the present case, the measure result is a listing of the retrieved measure values, so the measure values retrieved for each cell are loaded (step 275) into the cell. Accordingly, the Sales($) measure value in the first record in Query 3 (Q3: 1) is retrieved and listed in the Sales ($) cell in cell set $362_1$. The unit sales measure value in the first record set in Query 3 (Q3: 1) is also retrieved and listed in the Sales(U) cell in cell set $362_1$. Similar operations are performed for each cell set $362_{1-16}$ in the layout mapping to obtain the view shown in FIG. 17.

F. Hierarchy Independence

In FIG. 17, the hierarchically related year and fiscal period dimensions appear on the same axis. In accordance with the present invention, these dimensions may also be placed on different axes in a view. This is not possible in traditional record management systems, which form views from slices of a traditional multi-dimensional record structure.

Such a view may be generated from the records in the master table 202, query map 203, and master table index 204 shown in FIGS. 15(a), 15(b), and 15(c), respectively. Once the record management system determines that a new view is to be generated (step 226, FIG. 6(a)), it gathers formatting information for the view (step 227).

The new view is to have a horizontal axis and a vertical axis. The year dimension is represented on the horizontal axis, and the fiscal period dimension is represented on the vertical axis. Only the dollar sales measure is to be represented in the cells. Additionally, measure results for each cell are to be determined by summing the measure values that are identified for the cell.

Once the formatting information is gathered, the record management system 200 generates a layout mapping (step 228), as shown in FIG. 18. Groups of records are identified for both the horizontal axis 370 and the vertical axis 371, in accordance with the present invention, by using the master index table 202 shown in FIG. 15(c) and the procedures described above with reference to FIGS. 6(a), 6(c), and 6(d). For the horizontal axis 370, each group of records (1H and 2H) consists of records that include a measure value associated with the dollar sales measure and appear in a year dimension index record $320_{1-2}$ that corresponds to the dimension represented by the group. Table M shows the identification (step 260) of each group (1H and 2H) for the horizontal axis 370.

TABLE M

| INDEX RECORD | FROCESSING | GROUP RECORDS | GROUP |
|---|---|---|---|
| 1995 |  | Q1: 1–4 | 1H |
|  |  | Q2: 1–4 |  |

TABLE M-continued

| INDEX RECORD PROCESSING | GROUP RECORDS | GROUP |
|---|---|---|
| 1996 | Q3: 1–8<br>Q1: 5–10<br>Q2: 5–13<br>Q3: 9–16 | 2H |

As shown in Table M, the horizontal axis includes two groups of records (1H and 2H). Each group has been identified by taking the records listed in a corresponding dimension index record for one of the year dimension records $320_{1-2}$ and determining which records, if any, include a Sales($) measure value. This determination is made for each record by examining the query map record for the query that produced the record. If the query called for the dollar sales measure, then the record is designated as a group record (step 266, FIG. 6(d)). Otherwise, the record is not included in the group.

For the vertical axis 371, each group of records (1V–4V) includes records that appear in one of the fiscal period dimension index records $320_{11-14}$ and include a measure value for the dollar sales measure. Table N shows the identification of each group (1V–4V) for the vertical axis 371.

TABLE N

| INDEX RECORD PROCESSING | GROUP RECORDS | GROUP |
|---|---|---|
| P1 | Q3: 1, 5, 9, 13 | 1V |
| P2 | Q3: 2, 6, 10, 14 | 2V |
| P3 | Q3: 3, 7, 11, 15 | 3V |
| P4 | Q3: 4, 8, 12, 16 | 4V |

As shown in Table N, the vertical axis 371 includes four groups of records (1V–4V). Each group has been identified by taking the records listed in a dimension index record for one of the fiscal period dimension records $320_{11-14}$ and determining which records, if any, include a dollar sales measure value. This determination is performed in the same manner as described for Table M.

Once the groups are established for each axis 370, 371, the cells $372_{1-8}$ for the layout mapping are designated in the layout mapping storage unit 205. Two cell sets are designated, with each set corresponding to a different one of the horizontal axis groups (1H and 2H). Each set of cells includes four cells, with each cell corresponding to a different one of the vertical axis groups (1V–4V).

After the layout mapping is created, a multi-dimensional view is generated (step 229) from the layout mapping. FIG. 19 illustrates the resulting multi-dimensional view as it is displayed (step 230) by the record management system 200. For each cell $372_{1-8}$, a set of records is identified (step 273, FIG. 6(f)) for determining a measure result (step 274). Table O shows a comparison of group records that is performed to identify records for each cell $372_{1-8}$.

TABLE O

| CELL | GROUP COMPARISON | RECORDS |
|---|---|---|
| $372_1$ | 1H ∩ 1V | Q3: 1, 5 |
| $372_2$ | 2H ∩ 1V | Q3: 2, 6 |
| $372_3$ | 1H ∩ 2V | Q3: 3, 7 |
| $372_4$ | 2H ∩ 2V | Q3: 4, 8 |
| $372_5$ | 1H ∩ 3V | Q3: 9, 13 |
| $372_6$ | 2H ∩ 3V | Q3: 10, 14 |
| $372_7$ | 1H ∩ 4V | Q3: 11, 15 |
| $372_8$ | 2H ∩ 4V | Q3: 12, 16 |

As shown in Table O, each comparison for a cell identifies records that appear in each group corresponding to the cell. The comparison for each cell $372_{1-8}$ may be performed by taking the intersection of the records identified in the horizontal group (1H and 2H) corresponding to the cell and the vertical group (1V–4V) corresponding to the cell.

For the dollar sales measure in the first cell $372_1$, the intersection is taken of the records identified in the 1995 group (1H) and the P1 group (1V). The resulting set of records consists of records 1 and 5 from Query 3 (Q3: 1 and Q3: 5) in the master table 202.

For each cell $372_{1-8}$, the identified records are retrieved from the master table 202 and used to determine a measure result (step 274). Since a summing operation is called for in determining the measure result, the retrieved measure values from each identified record in a cell are summed together. The sum is then loaded into the cell (step 275). For example, a dollar sales measure result of $30,000 is placed in cell $372_1$ as a result of summing the sales dollar measure values in record sets 1 and 5 from Query 3 (Q3: 1 and Q3: 5) in the master table 202.

In addition to loading the cells $372_{1-8}$ with measure results, the record management system 200 generates a horizontal axis 373 display and vertical axis 374 display as described above with reference to FIG. 6(f). Once the view is completed, the record management system 200 displays the view (step 230) as shown in FIG. 19.

Although the above examples provide specific multi-dimensional views that may be generated in accordance with the present invention, many other views may be created by employing aspects of the present invention.

G. Computer Hardware

Figure 20:
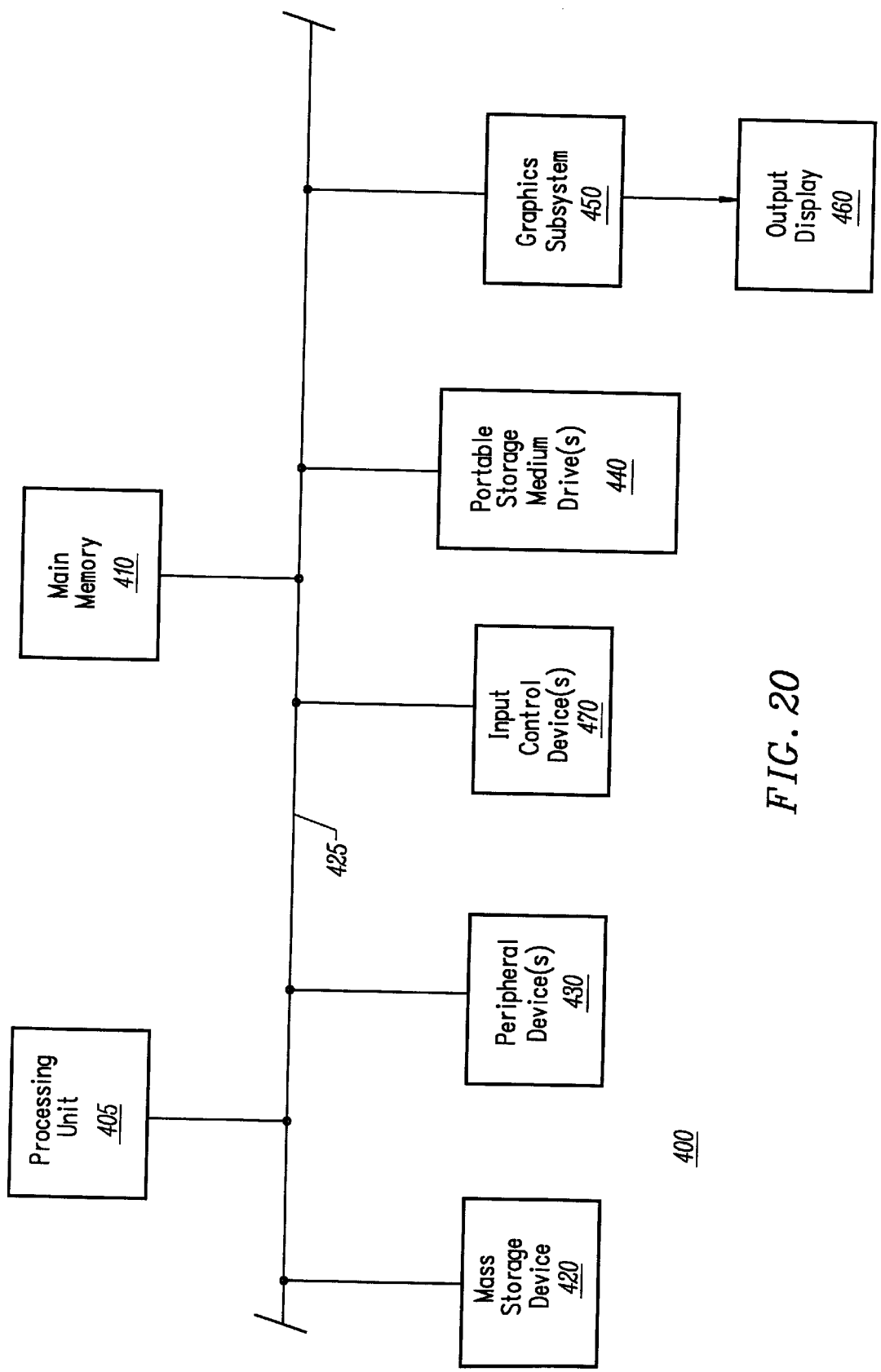
FIG. 20 illustrates computer system hardware that may be employed to operate as the multi-dimensional record management system shown in FIG. 5.

FIG. 20 illustrates a high level block diagram of a general purpose computer system 400, which may be employed in embodiments of the present invention as a record management system 200. Accordingly, the computer system 400 may be employed for performing a number of processes, including those illustrated in FIGS. 6(a)–6(f).

The computer system 400 contains a processing unit 405, main memory 410, and an interconnect bus 425. The processing unit 405 may contain a single microprocessor, or may contain a plurality of microprocessors for configuring the computer system 400 as a multi-processor system. The processing unit 405 may serve as the processor for each of the processing engines in the record management system 200. Accordingly, the control engine 209, query engine 210, index engine 211, and layout engine 212 can be implemented using the processor unit 405 in conjunction with a memory or other data storage medium containing corresponding application specific program code instructions for each engine.

The main memory 410 stores, in part, instructions and data for execution by the processing unit 405. If a process, such as the processes illustrated in FIGS. 6(a)–6(f), is wholly or partially implemented in software, the main memory 410 may store the executable instructions for implementing the process when the computer is in operation. For example, the main memory 410 may store program code instructions to be employed by the control engine 209, query engine 210, index engine 211, and layout engine 212 or a subset of these engines. The master table storage unit 202, query map storage unit 203, master table index storage unit 204, layout mapping storage unit 205, and metadata storage unit 207 may also be implemented in the main memory 410. The main memory 410 may include banks of dynamic random access memory (DRAM) as well as high speed cache memory.

The computer system 400 may further include a mass storage device 420, peripheral device(s) 430, portable storage medium drive(s) 440, input control device(s) 470, a graphics subsystem 450, and an output display 460 For purposes of simplicity, all components in the computer system 400 are shown in FIG. 20 as being connected via the bus 425. However, the computer system 400 may be connected through one or more data transport means. For example, the processor unit 405 and the main memory 410 may be connected via a local microprocessor bus, and the mass storage device 420, peripheral device(s) 430, portable storage medium drive(s) 440, and graphics subsystem 450 may be connected via one or more input/output (I/O) busses.

The mass storage device 420, which may be implemented with a magnetic disk drive or an optical disk drive, is a non-volatile storage device for storing data and instructions for use by the processor unit 405. In software embodiments of the present invention, the mass storage device 420 may store the instructions executed by the computer system 400 to perform processes for the control engine 209, query engine 210, index engine 211, and layout engine 212, such as those illustrate in FIGS. 6(a)–6(f). The mass storage device 420 may also act as a storage medium for the master table storage unit 202, query map storage unit 203, master table index storage unit 204, layout mapping storage unit 205, and metadata storage unit 207.

The portable storage medium drive 440 operates in conjunction with a portable non-volatile storage medium, such as a floppy disk, a compact disc read only memory (CD-ROM), or an integrated circuit non-volatile memory adapter (i.e. PC-MCIA adapter) to input and output data and code to and from the computer system 400. In one embodiment, the instructions for enabling the computer system to execute processes, such as those illustrated in FIGS. 6(a)–6(f), are stored on such a portable medium, and are input to the computer system 400 via the portable storage medium drive 440.

The peripheral device(s) 430 may include any type of computer support device, such as an input/output (I/O) interface, to add additional functionality to the computer system 400. For example, the peripheral device(s) 430 may include a communications controller, such as a network interface card or integrated circuit, for interfacing the computer system 400 to a communications network. Instructions for enabling the computer system 400 to perform processes, such as those illustrated in FIGS. 6(a)–6(f), may be downloaded into the computer system's main memory 410 over a communications network. The computer system 400 may also interface to a database management system 213 over a communications network or other medium that is supported by the peripheral device(s) 430.

The input control device(s) 470 provide a portion of the user interface for a user of the computer system 400. The input control device(s) 470 may include an alphanumeric keypad for inputting alphanumeric and other key information, a cursor control device, such as a mouse, a trackball, stylus, or cursor direction keys. The input control device(s) 470 can serve as the input control unit 201 for the record management system 200.

In order to display textual and graphical information, such as multi-dimensional views, the computer system 400 contains the graphics subsystem 450 and the output display 460. The output display 460 may include a cathode ray tube (CRT) display or liquid crystal display (LCD). The graphics subsystem 450 receives textual and graphical information, and processes the information for output to the output display 460. The graphics subsystem 450 and output display 460 may combine to form the display unit 206 for the record management system.

The components contained in the computer system 400 are those typically found in general purpose computer systems. In fact, these components are intended to represent a broad category of such computer components that are well known in the art.

The process steps and other functions described above with respect to embodiments of the present invention may be implemented as software instructions. More particularly, the process steps illustrated in FIGS. 6(a)–6(f), as well as the operations performed by the control engine 209, query engine 210, index engine 211, and layout engine 212, may be implemented as software instructions. For the preferred software implementation, the software includes a plurality of computer executable instructions for implementation on a general purpose computer system. Prior to loading into a general purpose computer system, the software instructions may reside as encoded information on a computer readable medium, such as a magnetic floppy disk, magnetic tape, and compact disc read only memory (CD-ROM). In one hardware implementation, circuits may be developed to perform the process steps and other functions described herein.

Although aspects of the present invention have been described with respect to specific examples of multi-dimensional views that may be formed and in terms of specific exemplary embodiments, it will be appreciated that various modifications and alterations might be made by those skilled in the art without departing from the spirit and scope of the invention.

What is claimed is:

1. A method for generating an index for a master table in a record management system, wherein a set of N dimension values are represented throughout a set of records in said master table, and wherein N is an integer, said method including the steps of:

(a) identifying records in said set of records in said master table that include a dimension value in said set of N dimension values, wherein said dimension value is identified by a variable name dimension_value$_n$, wherein n is an integer in a range of 1 to N; and (b) generating a dimension index record in said index, wherein said dimension index record is identified by a variable name dimension_index_record$_n$, wherein said dimension_index_record$_n$ identifies said records identified in said step (a).

2. The method of claim 1, wherein said records identified in said step (a) include all records in said master table that include said dimension_value$_n$.

3. The method of claim 1, wherein said step (a) and said step (b) are each performed N number of times with n being equal to a different value in said range of 1 to N each of said N times.

4. The method of claim 1, wherein said dimension_index_record$_n$ identifies a dimension associated with said dimension_value$_n$.

5. The method of claim 1, wherein said dimension_index_record$_n$ identifies said dimension_value$_n$.

6. A method for creating a foundation for enabling data to be multi-dimensionally manipulated, comprising the steps of:

storing a set of data records, each data record having at least one measure value and a plurality of dimension values;

determining, from all dimension values in said set of data records, which dimension values are distinct; and for each distinct dimension value:
identifying all data records containing said distinct dimension value;
generating a mapping to all the data records in said set of data records containing said distinct dimension value; and
storing said mapping in association with said distinct dimension value into an entry of a master index.

7. The method of claim 6, wherein said master index is stored as a separate structure from said set of data records, and wherein said mapping contains no measure values.

8. The method of claim 6, wherein said set of data records is stored as a relational table, wherein said master index is stored as a separate structure from said relational table, and wherein said mapping contains no measure values.

9. A computer readable medium having a set of instructions stored therein for enabling a computer to generate an index for a master table in a record management system, wherein a set of N dimension values are represented throughout a set of records in said master table, and wherein N is an integer, said set of instructions including:

a first set of instructions, which when executed by the computer cause the computer to identify records in said set of records in said master table that include a dimension value in said set of N dimension values, wherein said dimension value is identified by a variable name dimension_value$_n$, wherein n is an integer in a range of 1 to N; and a second set of instructions, which when executed by the computer cause the computer to generate a dimension index record in said index, wherein said dimension index record is identified by a variable name dimension_index_record$_n$, wherein said dimension_index_record$_n$ identifies said records identified to include said dimension_value$_n$.

10. The computer readable medium of claim 9, wherein said records identified to include said dimension_value$_n$ include all records in said master table that include said dimension_value$_n$.

11. The computer readable medium of claim 9, wherein said dimension_index_record$_n$ identifies said dimension_value$_n$ and a dimension associated with said dimension_value$_n$.

12. The computer readable medium of claim 9, wherein said set of instructions further includes:

a third set of instructions, which when executed by the computer cause the computer to execute said first set of instructions and said second set of instructions N number of times with n being equal to a different value in said range of 1 to N each of said N number of times.

13. A record management system comprsing:

a master table storage unit for maintaining a set of records, wherein a set of N dimension values are represented throughout said set of records and wherein N is an integer;

a master table index storage unit; and an index ensine coupled to said master table storage unit and said master table index storage unit for generating an index of said master table storage unit in said master table index storage unit, said index engine implemented by a plurality of computer executable instructions;

wherein said index engine identifies records in said set of records in said master table storage unit that include a dimension value in said set of N dimension values, wherein said dimension value is identified by a variable name dimension_value$_n$, wherein n is an integer in a range of 1 to N.

14. The record management system of claim 13, wherein said index engine generates a dimension index record in said master table index storage unit, wherein said dimension index record is identified by a variable name dimension_index_record$_n$, wherein said dimension_index_record$_n$ identifies said records identified to include said dimension_value$_n$.

15. The record management system of claim 14, wherein said dimension_index_record$_n$ identifies said dimension_value$_n$ and a dimension associated with said dimension_value$_n$.

16. The record management system of claim 14, wherein said records identified to include said dimension_value$_n$ include all records in said master table storage unit that include said dimension_value$_n$.

* * * * *